United States Patent [19]

Steward et al.

[11] Patent Number: 4,800,502

[45] Date of Patent: Jan. 24, 1989

[54] FARE COMPUTER

[75] Inventors: Eugene A. Steward, 5829 - 7th St., NW., Washington, D.C. 20011; Ralph L. Robinson, 4009 Parkwood St., Brentwood, Md. 20722

[73] Assignees: Eugene A. Steward, Washington, D.C.; Ralph L. Robinson, Brentwood, Md. ; part interest to each

[21] Appl. No.: 172,972

[22] Filed: Mar. 22, 1988

Related U.S. Application Data

[63] Continuation of Ser. No. 741,324, Jun. 4, 1985, abandoned.

[51] Int. Cl.$^4$ .............................................. G06F 15/50
[52] U.S. Cl. .................................... 364/467; 364/444; 364/424.01; 235/30 R
[58] Field of Search ............... 364/467, 561, 569, 424, 364/444, 449, 710, 715, 709; 73/490, 495; 235/30 R, 30 A, 45; 377/9, 14, 20

[56] References Cited

U.S. PATENT DOCUMENTS

| | | | |
|---|---|---|---|
| 3,212,615 | 10/1965 | Hellar, Jr. ........................... | 364/467 |
| 3,843,874 | 10/1974 | Kelch ................................... | 364/467 |
| 3,931,508 | 1/1976 | Kelch ................................... | 364/467 |
| 3,983,378 | 9/1976 | Tami ................................... | 364/467 |
| 4,053,749 | 10/1977 | Shinoda et al. ..................... | 364/467 |
| 4,081,663 | 3/1978 | Ahlberg ............................... | 364/467 |
| 4,212,069 | 7/1980 | Baumann ............................. | 364/467 |
| 4,240,146 | 12/1980 | Iles ...................................... | 364/467 |
| 4,389,563 | 6/1983 | Ricard ................................. | 364/467 |
| 4,511,973 | 4/1985 | Miura et al. ........................ | 364/424 |
| 4,539,644 | 9/1985 | Adams et al. ....................... | 364/467 |
| 4,547,781 | 10/1985 | Gelhorn et al. .................... | 377/24 |
| 4,570,227 | 2/1986 | Tachi et al. ......................... | 364/424 |
| 4,571,684 | 2/1986 | Takanabe et al. .................. | 364/424 |
| 4,608,656 | 8/1986 | Tanaka et al. ...................... | 364/424 |
| 4,630,209 | 12/1986 | Saito et al. ......................... | 364/444 |
| 4,660,037 | 4/1987 | Nakamura .......................... | 364/449 |
| 4,677,563 | 6/1987 | Itoh et al. ........................... | 364/449 |

FOREIGN PATENT DOCUMENTS 2076200 11/1981 United Kingdom ................ 364/467

Primary Examiner—Parshotam S. Lall
Assistant Examiner—Brian M. Mattson
Attorney, Agent, or Firm—Beveridge, DeGrandi & Weilacher

[57] ABSTRACT

A fare computer for a taxi, a freight carrier, or other use calculates the fare, display the fare as it accrues and displays visual representations of each charge contributing to the accrued fare. The fare computer is particularly suited for use in those localitites in which the taxi fare is based upon zones of travel, in accordance with a zone tariff schedule, rather than on total distance travelled. In a first mode, or ZONE TARIFF MODE, the fare computer calculates the fare from primary charge data, derived from the number of zones traversed in travelling from the origin of the trip to the destination, and secondary charge data, derived from such events as the handling of luggage or pets, extra stops, extra passengers or responding to a telephone request for passenger pick up. A display presents visual representations of the origin and destination zones and of each secondary charge contributing to the accrued fare, along with display of the total accrued fare. Alternatively, in a second mode, or HOURLY RATE MODE, the fare computer computes a fare based upon primary charges derived from the time the vehicle is under hire, such as for limousine or sight-seeing services, and particular secondary charges. The fare computer of the present invention is a microprocessor-based, solid state, integrated unit.

7 Claims, 2 Drawing Sheets

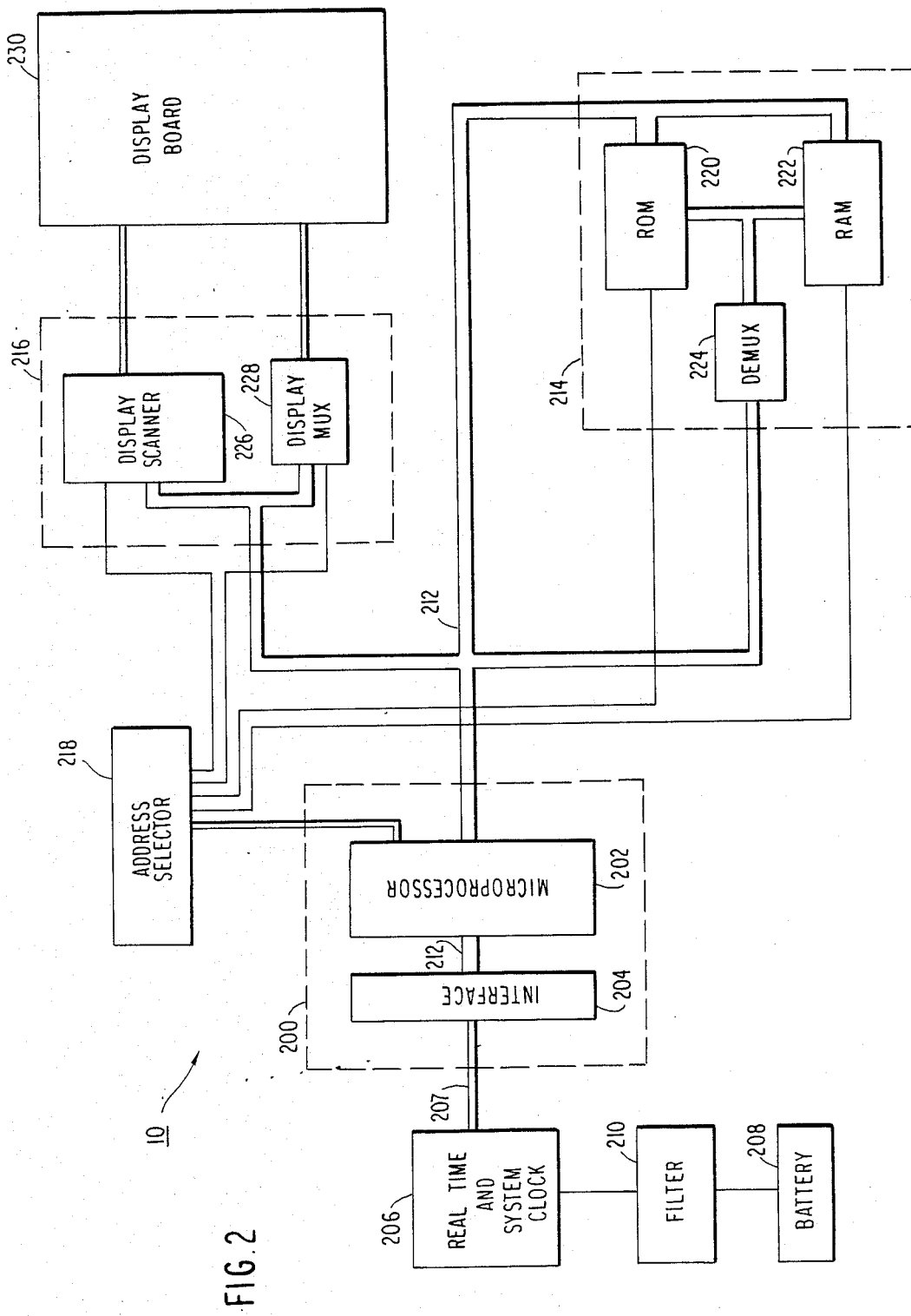

FARE COMPUTER

This application is a continuation of application Ser. No. 741,324, filed June 4, 1985, now abandoned.

The present invention relates generally to an electronic fare computer, usable, for example, in a taxi, for calculating the fare for use of the taxi, displaying the fare as it accrues and displaying a visual representation of substantially each charge contributing to the accrued fare. The invention is particularly suited for use in locations in which the taxi fare is based on zones of travel rather than on total miles travelled. The fare computer might also be utilized in other situations in which a charge is based on the number of zones through which travel occurs rather than on mileage, as for example could be done in carrying freight. The fare computer of the invention is particularly adapted for accepting data indicative of a zone containing the point of origin for hired travel and a zone containing the point of destination, displaying visual representations of such zone or zones to the passenger, and computing and displaying the fare. The invention also relates to a method of calculating and displaying each charge contributing to the accrued fare so that the passenger can immediately know the accrued fare and the manner of calculation thereof.

BACKGROUND OF THE INVENTION

Fare meters adapted to register a plurality of charges which contribute to the total calculated fare have been of great value to taxi operators and others for automatically calculating such fare. U.S. Pat. No. 3,983,378 discloses a fare measurer including means for counting electrical impulses proportional to either the speed of the vehicle or the time during which the vehicle remains motionless, i.e. waiting time. The pulses indicative of distance travelled or waiting time are transmitted to a binary multiplier wherein the taxi operator selects a multiplication factor by means of several banks of binary switches to determine the fare in accordance with lawful tariffs in the locality. Additional binary switches are provided to enable the fare measurer to register secondary charges such as the number of passengers, baggage handled, elapsed waiting time or special fare rates depending upon, for example, location or time of day. The fare is then automatically calculated and the total fare displayed to the operator by a digital display.

U.S. Pat. No. 3,843,874 shows a taxi meter having pushbuttons for registering the costs of additional services and charges such as the handling of trunks or the paying of bridge and tunnel tolls. Each pressing of a pushbutton increments a fare display by a preselected amount. The patent suggests that where each pressing of the button registers a further charge of ten cents, a 50 cent bridge toll would require five such depressions to provide a visual record of the additional amount to be collected from the passenger at the conclusion of the trip.

The fare measurer of U.S. Pat. No. 3,843,874 further suggests the use of pushbuttons to enable selection of one of four particular tariff schedules, one of which might depend upon the number of zones through which the taxi passes. Nevertheless, the patent discloses the determination of the fare based on the number of impulses counted from a pulse generator operating in response to the distance travelled; the pushbuttons merely select the desired one of a plurality of frequency divider outputs. The operator adds the fare calculated from the selected tariff schedule to the additional services cost to arrive at a total fare charged to the customer.

These types of electronic faremeters automatically perform the calculation of the fare in response to the charges entered therein by the operator and then merely display numerical representations of the fare derived from the charges. Such units display only information relating to cumulative totals such as the total fare or subtotals of the fare resulting from, for example, the distance travelled or the number of bags and trunks carried during the hired travel. Thus, the passenger is often unable to ascertain which and how many charges were added to arrive at the total fare. Indeed, in some situations, not even the total fare is in view of the passenger and thus the passenger is not made aware of it until the destination is reached.

Prior art taximeters are further seen to lack particular adaptation to fare calculation for hired travel within a zone tariff schedule locality wherein the fare meter receives data indicative of a zone containing the origin of the travel and a zone containing the destination of the travel. To be completely effective such a zone-adapted fare meter must also be quickly and simply adaptable to calculate fares based on alternative tariff schedules.

SUMMARY OF THE INVENTION

The fare computer of the present invention overcomes the shortcomings of taximeters known to prior art. The invention relates to an electronic fare computer for calculating and displaying accrued fares, and particularly for generating visual displays representing substantially each charge contributing to the accrued fare during the hired travel and the total fare at the end of the travel. Throughout the hired travel, the current accrued fare is displayed along with such visual representations in such a way as to show the passenger the manner in which the total fare is calculated. The fare computer of the present invention is particularly suited for zoned tariff localities wherein a primary, or possibly the only, charge contributing to the total fare is calculated from the number of zones crossed during the hired travel. Alternatively, the fare computer is adaptable to operation on a pure hourly basis or even a distance/time tariff basis, depending upon locality and terms of the hire.

The fare computer of the present invention is completely adapted to be operated within a vehicle such as a taxi from the vehicle's power supply. The fare computer is preferably an entirely electronic solid state, integrated unit to calculate and display a visual representation of substantially each charge contributing to the fare. It permits fare computations with any of a plurality of pre-programmed tariff bases as authorized by the laws or regulations of a given locality and adjacent or surrounding localities. Means are provided to prevent the erroneous entry of fare charge data, and the present fare computer further includes means for preventing fraudulent calculation of a fare.

Alternatively, the fare computer of the present invention is suitable for rate calculations applicable in the trucking or like long distance transportation industries.

The fare computer includes operator actuated input means for registering or accepting a selected tariff schedule such as a zone tariff schedule or an hourly rate schedule. In the ZONE TARIFF MODE, the operator input means further accepts or registers primary charge data representative of the zone containing the origin of the hired travel and the zone containing the destination of the hired travel, as well as secondary charge data representative of all other contributory charges such as the number of suitcases, the number of trunks, the number of pets, rush hour surcharges and elapsed waiting time. In an HOURLY RATE MODE, corresponding to, for example, limousine or sight-seeing service, the fare computer accepts primary charge data representative of the time under hire and limited secondary charge data.

A processing circuit receives the selected tariff schedule and fare charge data and computes an accrued fare therefrom. The processing circuit communicates with a first memory for permanently storing a predetermined compilation of data and a second memory for temporarily storing data transmitted thereto by the processing circuit. In the preferred embodiment, the compilation stored in the first memory includes an operating program for the processing circuit and rate tables containing values for each fare charge received by the processing circuit for calculation of the accrued fare rate. Thus, the tariff schedule and fare charge data are received from the taxi operator by the operator-actuated input and are transmitted to the processing circuit. The fare charge data are then used by the processing circuit to calculate the accrued fare from permanently stored values for the particular tariff and the contributing fare charges selectively entered by the operator.

The inventive apparatus also comprises a display scanner/controller connected to the processing circuit for controlling a digital display and sensing input data conditions at the operator input. The display scanner/controller includes a display sensing element for sensing inputs and a multiplexing element for selectively providing appropriate visual displays.

BRIEF DESCRIPTION OF THE DRAWINGS

These and other aspects and advantages of the present invention are more apparent from the following detailed description and claims, particularly when considered in conjunction with the accompanying drawings in which like parts bear like reference numerals. In the drawings:

FIG. 2 is a block diagram of the circuitry of a fare computer in accordance with a preferred embodiment of the present invention.

DESCRIPTION OF THE PREFERRED EMBODIMENT

Figure 1:
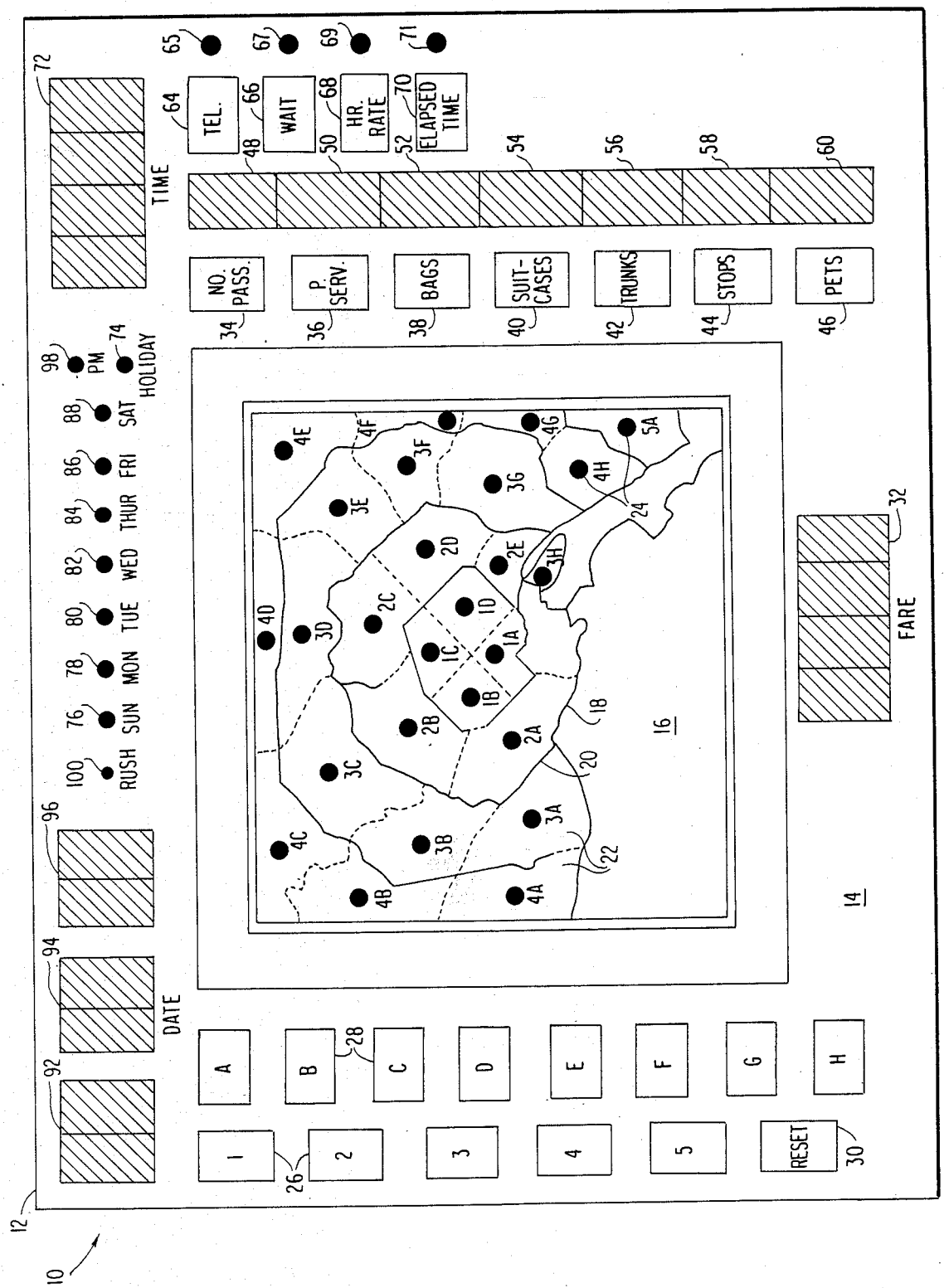
FIG. 1 is a plan view of a fare computer in accordance with a preferred embodiment of the present invention and particularly shows the displays and the input controls.

FIGS. 1 and 2 illustrate a preferred embodiment of the present invention. Fare computer 10 is packaged in a housing 12 having a front display/control panel 14. All controls and displays for the fare computer are arrayed to be available at panel 14.

Display/control panel 14 includes at its central portion a map 16 showing the locality of primary operation divided into a plurality of zones, collectively indicated by reference number 18 and individually denoted by the numbers 1, 2, 3, 4 and 5 respectively. Zones 18 may, for example, have border lines 20 corresponding to city streets as shown in FIG. 1. Alternatively, zones 18 may be defined according to any law or regulation governing tariffs in the locality. As illustrated by map 16, each individual zone 1, 2, 3, 4, or 5 can be further divided into subzones generally noted by reference number 22 and individually denoted by the zone number followed by a letter A through H. Thus, each zone 18 shown on map 16 is divided into several subzones 22, each of which is provided with a particular designator, such as subzone 1A or 3E.

Map 16 also includes in one-to-one correspondence with each subzone 22, a light emitting diode or LED 24. LEDs 24, as will be discussed infra, are activated by means of a series of zone select controls 26 and a series of subzone select controls 28. As seen from FIG. 1, controls 26 and 28 may conveniently be embodied in the form of pushbutton switches or keys. Depression of a desired zone select control 26 and a subzone select control 28 actuates the LED 24 in the particular corresponding subzone 22 on map 16, thereby identifying that subzone to the viewer.

In the preferred embodiment, zone select controls 26 are labeled "1", "2", "3", "4" and "5" and include five pushbuttons or keys corresponding to each of the five zones 18 designated 1, 2, 3, 4 and 5 on map 16. Likewise, subzone select controls 28 are labeled "A"; "B"; "C"; "D"; "E"; "F"; "G"; "H" to correspond with the defined subzones 22. Thus, in the preferred embodiment, the point of origin for a hired travel is indicated by first depressing the zone key 26 and then the subzone key 28 corresponding with the subzone of origin to activate the LED 24 indicating that particular subzone 22 on map 16. Next the zone key 26 and subzone key 28 indicating the subzone of the intended destination are depressed, activating the LED 24 indicating that subzone on map 16. These LEDs then provide a visual display of the points of origin and destination to the passenger. Preferably, the LED indicating the origin subzone is continuously activated while the LED corresponding to the destination subzone is intermittently activated, i.e. blinking on and off, so that the passenger can easily distinguish the respective subzones containing the origin and the destination of the hired travel. If the origin and destination are within the same subzone, then a single LED 24 is activated, and it can be either continuously or intermittently activated.

Those skilled in the art will appreciate that both the zone selecting controls 26 and the subzone selecting controls 28 may comprise illuminating switches which illuminate upon depression, either continuously or intermittently as appropriate, to indicate to the passenger the origin and destination indications which have been entered into fare computer 10. In such an embodiment, map 16 and LEDs 24 could be omitted from display/control panel 14, if desired.

Reset control 30, also shown as a key or a pushbutton switch in FIG. 1, is provided to extinguish all activated LEDs 24 on map 16 at the conclusion of the hired travel or, for example, after an inadvertent entry of origin or destination data. Following activation of the reset control 30, fare computer 10 is reset and thus is prepared for entry of new fare data.

Accrued fare display 32 is a four-digit display, preferably made up of four seven segment display elements, for displaying the fare, as it accrues, to both the operator and the passenger. As is evident, display 32 may comprise a LED, LCD or like seven segment display element. Upon completion of the hired travel, fare display 32 presents the total fare. In the ZONE TARIFF MODE of operation, fare display 32 initially displays a primary fare charge determined from the number of zones to be crossed in travelling from the origin point, the zone of which is indicated by a continuously lit LED 24 on map 16, to the destination point, the zone of which is indicated by the blinking LED 24. This component of the total fare is calculated as prescribed by law or regulation to depend on the number of zones to be traversed during the hired travel and is displayed after the origin and destination zones have been entered via pushbuttons 26 and 28. The derived primary fare charge is displayed as a dollar amount at fare display 32 for the benefit of the passenger and the operator.

Alternatively, if the hired vehicle is to be operated in a locality having a tariff schedule other than the zone schedule detailed above, for example a time/distance fare schedule, fare computer 109 may be adapted in ways well known to those skilled in the art to include switching means (not shown) for causing fare display 32 to display the fare as it accrues according to distance travelled during the hire. Such an embodiment of the present invention would further display the fare as accruing according to the elapsed time that the hired vehicle remains motionless or proceeds below a predetermined speed. Thus, fare computer 10 may operate in the manner of conventional electronic fare meters by conventional pulse-counting techniques.

Secondary charge select controls 34, 36, 38, 40, 42, 44, and 46, also shown in FIG. 1 as pushbutton switches, bear respectively the legends "NO. PASS" (number of passengers); "P. SERV" (personal services); "BAGS"; "SUIT CASES"; "TRUNKS"; "STOPS"; and "PETS". Controls 34, 36, 38, 40, 42, 44, and 46 are respectively associated with corresponding seven segment display elements 48, 50, 52, 54, 56, 58, and 60. Each seven segment display 48-60 may be an LED, LCD or like display for providing a digital representation thereon. In the preferred embodiment, each of the displays 48-60 is operated independently of the remaining displays. Each time one of the controls 34-46 is depressed, the corresponding one of the display elements 48-60 is incremented to indicate the associated secondary charge units added to the accrued fare. Thus, for example, where the operator charges for carrying three suit cases, control 40 labeled "SUIT CASES" is depressed three times to successively increment element 54 immediately adjacent control 40 to display the digit "3", indicating that an appropriate charge for three suitcases has been added to the accrued fare appearing at fare display 32. Likewise, if the passenger requests that a number of stops be made during the hired travel, the operator depresses "STOPS" control key 44 the corresponding number of times to increment the display at element 58 to reflect the number of stops made and to add the charges therefor to the accrued fare presented at display 32. Personal services control 36 might be operated to register a secondary fare charge, for example, whenever a request by the passenger requires the vehicle operator to leave the confines of the hired vehicle.

Remaining secondary charge controls 64, 66, 68 and 70 also shown as comprising push buttons or keys bear the legends "TEL." (telephone); "WAIT" (waiting time); "HR." (hourly rate); and "ELAPSED TIME". Controls 64, 66, 68 and 70 are associated respectively with LEDs 65, 67, 69, and 71. Operation of any of the controls 64-68 activates the associated LED 65-71 and adjusts the accrued fare displayed at display 32. If the taxi is picking up the passenger at a designated location in response to a telephone call to the taxi dispatcher, for which an additional charge is made, TEL control 64 is depressed to activate LED 65 and add the additional charge to the accrued fare shown on display 32. In the preferred embodiment telephone control key 64 may be depressed only once during any one hired trip, since the taxi is responding to a single telephone call. Alternatively, if it is the operator's experience that more than one telephone call is sometimes involved, it is a relatively simple matter to those skilled in the art to adapt fare computer 10 to admitting data for more than one call.

"WAITING TIME" control 66 causes fare charges to accrue while the vehicle is under hire by the passenger but temporarily remains stationary. Accrual of the fare is shown by periodic increases in the fare displayed at digital display 32. Digital clock display 72 is made up of four commonly controlled seven segment elements. Clock 72 normally shows the time of day, but by depressing "ELAPSED TIME" control 70 may be made alternatively to display the time elapsed since "WAITING TIME" control key 66 was depressed. Manipulation of "ELAPSED TIME" control 70 causes clock 72 to display the elapsed waiting time until a subsequent depression of control 70 returns the display of clock 72 to that of the time of day. Alternatively, clock 72 can display the elapsed waiting time so long as "ELAPSED TIME" control 70 is held in its depressed position, with clock 72 returning to the display of the time of day when control 70 is released.

As should be evident to one skilled in the art, any additional secondary fare charges authorized by law may be included, along with the associated controls and indicators at display/control panel 14.

Depression of HR. RATE key 68 places fare computer 10 in an HOURLY RATE MODE which disables zone select controls 26, subzone select controls 28, LEDS 24 and controls 34, 38-46, 64 and 66. In the HOURLY RATE MODE, fare computer 10 calculates the fare strictly on the basis of a primary fare charge depending upon the time elapsed while the vehicle is under hire and any secondary fare charges arising from personal services performed by the operator during the hire. In this way fare computer 10 is adapted to calculate, for example, the fare for limousine or sight-seeing services.

In the HOURLY RATE MODE, depression of "ELAPSED TIME" control 70 causes clock 72 to display the elapsed time during which the vehicle has been hired at an hourly rate. All the while, fare display 32 presents the fare as accrued according to the time during which the vehicle has been under hire plus any accrued secondary charges. Thus the passenger is presented with the elapsed time under hire and the fare charge for that time, so that the hourly rate can be simply calculated from the accrued fare divided by the time elapsed. Subsequent depression of control 70 likewise returns clock 72 to displaying the time of day.

Subsequent depression of "HOURLY RATE" control 68 terminates the HOURLY RATE MODE and returns fare computer 10 to operation in the ZONE TARIFF MODE. At any time clock 72 is made to display elapsed time either while waiting in the ZONE TARIFF MODE or the in HOURLY RATE MODE, an elapsed time display indicator 71 is activated.

LED indicators 76, 78, 80, 82, 84, 86 and 88 indicate the day of the week, Sunday through Saturday, and are automatically activated on the appropriate day. A system clock for the preferred fare computer 10 operates on an annual cycle and thus provides an indication of the day of the week at LEDs 76-88 and in addition displays the date at date display 90 in the form of paired digital displays 92, 94 and 96 indicating, respectively, the month, day and year. If fare computer 10 is programmed to recognize holidays, when different fare rates might be in effect, LED indicator 74 can be energized on such holidays. PM indicator 98, which can be an LED, is activated to indicate that the time displayed on clock 72 is afternoon and is extinguished during morning hours. Also, rush hour indicator 100 is provided to apprise the passenger that a rush hour fare, such as a surcharge to the accrued fare, is in effect and has been added to the fare presented at fare display 32.

With reference to FIG. 2, fare computer 10 includes a processing circuit 200 including a microprocessor 202 and an input/output (I/O) unit or interface unit 204. I/O unit 204 interfaces between processor 202 and system clock 206. As further discussed infra, processing circuit 200 reads and is synchronized over bus 207 by real time and system clock 206. Processing circuit 200 also includes an internal clock (not shown) for synchronizing communication between processing circuit 200 and the remaining elements of fare computer 10. Clock 206 receives primary power from the vehicle battery 208 through power supply filter 210. Backup or secondary power is provided in the event of failure of battery 208 by a backup power source (not shown) which is preferably included with filter 210. Such a back-up source could comprise a 3 volt Lithium battery. Clock 206, which may be sensitive to wide variances in temperature occurring when, for example, the vehicle is unoperated for extended periods, is preferably shielded by encapsulation within a power resistor (not shown) to maintain clock 206 above 32° F. In cold weather the power resistor-heater is connected to receive power from vehicle battery 208 or an auxiliary power source (not shown) within filter 210 in any way known to those skilled in the art.

Processing circuit 200, which includes a stored programmed control, is also connected via bus 212 to external memory unit 214 and to display scanner/controller 216. Processing circuit 200 selects from memory 214 or display scanner/controller 216 through address selector 218. As a further apparent from FIG. 2, address selector 218 is made to select particularly from between read only memory (ROM) 220 and random access memory (RAM) 222, both within external memory unit 214. Processing circuit 200 communicates with memories 220 and 222 either directly over bus 112 or indirectly through demultiplexor 224.

ROM 220 permanently and unalterably stores the main programs used by processing circuit 200 for calculating fares. ROM 220 permanently stores, for example in a look up table, a value for each particular fare charge corresponding to a hired travel from any subzone 22, constituting the point of origin, to any subzone 22, constituting the point of destination, for all such subzones 22 depicted on map 16. Microprocessor 202 merely looks up the appropriate value for such primary fare charge in ROM 220 whenever the subzones 22 containing the origin and the destination of hired travel are provided by means of selecting controls 26 and 28. ROM 220 likewise permanently stores representations or values for each secondary charge resulting from the depression of control keys 34-46, and each charge accruing as a result of operation of control keys 64-68. Thus, since fare computer 10 relies exclusively on ROM 220 for all fare rate data, as well as for the programs calculating the total fare, fare commputer 10 is protected from tampering to fraudulently alter the rates. Unauthorized tampering with the fare rates is prevented as ROM 220, by definition, is only readable by processing circuit 200. Thus, changing of fare rates or schedules can be effected only by authorized substitution of ROM 220 with a like unit having applicable new rates permanently stored therein.

RAM 222 stores on a temporary basis all fare charge data received by fare computer 10 during a hired travel. RAM 222 further stores the instantaneous accrued fare during the hired travel.

Communicating with memories 220 and 222, as well as with processing circuit 200 over bus system 212, scanner/controller 216 includes display scanner 226 and display multiplexer 228. In response to signals from processing circuit 200, display scanner/controller 216 drives the various displays of display board 230 corresponding to display/control panel 14. By means of display scanner 226, scanner/controller 216 also receives hired travel data from any of the control keys mounted on board 230.

In the preferred form, display scanner 226 includes internal random access memory (not shown) for temporarily storing fare charge data entered at display/control panel 14. Scanner 226 is programmable to have a particular scan rate such as 100 KHz to perform full scans of all control keys approximately every 10 microseconds. Upon scanning and storing entered fare charge data, scanner 226 provides a signal indicative of a change in state corresponding to entry of any fare charge data at control/display panel 14. Scanner 226 is responsive to system clock 206 for timing but executes programmed scan cycles independent of processing circuit 200. Thus, for instance, zone select keys 1, 2, 3, 4, and 5 are scanned first by scanner 226, followed by scanning of subzone select kyes A, B, C, D, E, F, G AND H to receive hired travel data for application into the internal memory of scanner 226.

An obvious alternative to the preferred scanner 226 would be a device for interrupting processor 202 upon sensing the entry of tariff schedule or fare charge data at panel 14. In such an embodiment, a processor 202 then would execute a specified interrupt routine to receive the data from such scanning device.

To effect calculation of the appropriate fare on fare computer 10, the vehicle operator selects from either the ZONE TARIFF MODE, by simply entering origination point data at zone and subzone select controls 26 and 28, or the HOURLY RATE MODE, by depressing "HOURLY RATE" control key 68. When fare computer 10 is operated in the ZONE TARIFF MODE, the driver first receives information regarding the destination of the hired travel from the passenger. Origin and destination data pertaining to the particular zones 18 and subzones 22 are entered at display/control panel 14. Note that the origin and destination data do not indicate the exact location of origin and destination but only the selected subzones. Thus, the fare is made up of a primary contributing charge, depending upon the number of zones traversed during the hired travel, plus secondary charges designated by the various control keys 34-70.

Those skilled in the art will appreciate that fare computer 10 need not be limited to the particular zone and subzone arrangement depicted by map 16. Indeed, ROM 220 may be made to store any zone and subzone arrangement. Thus, fare computer 10 is adaptable to localities having a greater or a lesser number of zones and/or subzones, or simply zones with no subzones, all independent of the area thereof. Thus, by way of example, when the vehicle is hired anywhere within subzone 3E on map 16, the vehicle operator enters data providing the origin of the hired travel by first depressing the zone select control 26 labeled "3", then depressing the subzone select key 28 labeled "E". Display scanner 226, performing continuous scanning of all input controls of panel 14, senses operation of the appropriate zone and subzone select keys 26, 28 and internally stores data representative of subzone "3E". Microprocessor 202 periodically executes supervisory interrogations of scanner 226 for any changes in state indicated thereby. Such a change in state is effected when the origin data, "3E", is sensed and stored by scanner 226. Microprocessor 202 responds to the change in state indicated by scanner 226 by executing a directed interrogation of the internal memory (not shown) of scanner 226 in order to determine the particular zone and subzone data entered at panel 14. At the same time, microprocessor 202 enables RAM 222 by means of address selector 218 so that the origin data can be received by both microprocessor 202 and RAM 222 over bus 212. Having received the data from scanner 226, processor 202 first terminates the write cycle for storing this data in RAM 222 and next interrogates ROM 220 for the address of the LED 24 corresponding to subzone 3E. Upon receipt of the appropriate address, microprocessor 202 transmits the same over bus 212 to display multiplexor 228 to activate the LED 24 within subzone "3E" on may 16.

In the same way, after the operator has been told the desired destination by the hiring passenger, the operator determines the subzone 22 containing the destination, for instance subzone "1B", and enters that subzone indication at panel 14 by successive depression of the zone select key 26 labeled "1" and the subzone select key 28 labeled "B". Display scanner 216 likewise transmits the appropriate signals to processing circuit 200 over bus 212, during direct interrogation by processor 202. Processor 202 in turn, reads from ROM 220 to find the address of the LED 24 corresponding to subzone "1B" and provides such to scanner/controller 216. RAM 222 also receives such destination data for subsequent use in determining the fare charge for travel from subzone "3E" to subzone "1B".

It will also be understood by those skilled in the art that scanner/controller 216 may independently cause activation of origin and destination designating LEDs 24 either prior to or concurrent with transmitting the corresponding origin or destination data over bus 212 to processing circuit 200. Alternatively, display/control panel 14 could comprise conventional switching circuits for automatically activating an appropriate LED 24 upon operation of zone and subzone select controls 26 and 28. The origin and destination data would likewise be sensed upon the next subsequent scan by scanner 226 for transmittal over bus 212 upon interrogation by processing circuit 200.

Fare computer 10, in the preferred form, includes a built-in error protection feature should the operator inadvertently enter, for example, a nonexistent subzone for either an origin or destination point. When such erroneous data is entered at display/control panel 14, processing circuit 200 executes an error indicating routine stored in ROM 220 to cause each LED 24 on map 16 to blink intermittently until the operator resets fare computer 10 by operating "RESET" control 30.

Normal operation continues with processor 202 interrogating RAM 222 to read the stored origin and destination data. Processor 202 receives the data and performs a "look-up" routine to locate the primary fare charge for travelling from subzone "3E" to subzone "1B" in the permanently stored rate tables of ROM 220. Processor 202 retrieves the proper value from ROM 220 and transmits signals representative of such charge over bus 212 to display multiplexer 228 for activation of digital fare display 32. While transmitting the primary fare value data over bus 212, processor 202 also executes a write cycle to cause RAM 222 to receive and temporarily store the accrued fare data. Multiplexer 228 causes fare display 32 to display that primary charge contributing to the total fare which corresponds to a hired travel between the selected subzones "3E" and "1B". The fare charge is displayed at fare charge display 32 to the passenger and to the operator.

To continue the exemplary explanation of the operation of fare computer 10, suppose that two passengers having a number of suitcases, a dog, and a trunk board the hired vehicle to travel from subzone "3E" to subzone "1B". Once the fare charge corresponding to travel from origin "3E" to destination "1B" is shown by fare display 32, the operator adjusts the fare to account for secondary charges corresponding to an extra passenger, a pet, and the particular types of luggage carried. Thus, for the second passenger, the operator depresses control key 34 labelled "NO. PASS." to increment element 48 of matrix 62 to show the number "2" corresponding to the second passenger. The signal generated by depression of control key 34 is sensed by scanner 226, and data indicative thereof is transmitted to processor 202 as previously described. Processor 202 interrogates ROM 220 for signals representative of the value corresponding to a secondary fare charge for the second passenger. Processor 202 receives the data from ROM 220, and performs an addition of the secondary charge corresponding to a second passenger and the subzone-to-subzone primary charge to arrive at an accrued fare charge accounting for the second passenger. Processor 202 then effects storage of the newly calculated accrued fare in RAM 222 and display of that fare by means of multiplexer 228 and display 32.

In the same way, processing circuit 200 receives secondary charge data indicative of the dog and the number of suitcases and trunks carried aboard, in the order that such data is entered at control keys 46, 40 and 42 respectively. Processing circuit 200 accordingly causes appropriate incrementation of each of display elements 60, 54 and 56 and executes successive addition sequences while communicating with external memory 214 to arrive at a total fare for the travel. The fare is then displayed at fare display 32.

Likewise, depression of the remaining fare charge control keys 36, 38, and 44 increments each corresponding element 50, 52, and 58. These corresponding elements are each initially blank and do not display a one as dose element 48 prior to entry of further fare charge data. Alternatively, all of display elements 50–60 may be made to display a zero prior to the entry of any fare charge data.

For operation during rush hour, fare computer 10 indicates that rush hour rates are in effect by means of LED 86. In the preferred operation of fare computer 10, processor 202 is programmed to interrogate ROM 220 for a rush hour surcharge during predetermined daily periods of unusually heavy traffic. Then during rush hours, display 32 is made to show the appropriate surcharge before any further fare charge data are entered to apprise the passenger of the exact portion of the total fare contributed by the rush hour surcharge.

When "WAITING TIME" control key 66 is depressed, as when the hired vehicle arrives at an origin point but must remain stationary until the passenger boards the vehicle, processor 202 begins to count pulses from system clock 206. Upon counting a preselected number of such clock pulses, processor 202 effects addition of a preselected value stored in ROM 220 to the fare charge displayed at display 32. A counter (not shown) within processor 202 resets and repeats the cycle to increase the fare by further waiting time charges as necessary. All the while, processing circuit 200 causes activation of LED 67 to remind the passenger that fare computer 10 has been calculating a waiting time fare charge.

In the preferred fare computer 10, microprocessor 202 is programmed to have a preselected maximum allowable waiting time after which fare increases attributed to "waiting time" are no longer calculated. Another feature of the preferred form is a preset period between consecutive operations of WAITING TIME control 66 before processor 202 will cause increases in the fare corresponding to depression of control key 66. This preset period may be set at, for example, three minutes or any time which, while not unduly burdening the operator, is likely to prevent subsequent activation of the "WAITING TIME" control before the next hiring of the vehicle to ensure against defrauding the next passenger.

Where the vehicle is hired for limousine or like service at strictly hourly rates, fare computer 10 is placed in the HOURLY RATE MODE. In this mode, processing circuit 200 disables function control keys 34, 38–46 and 64–68 in any known way as by disabling the scanning functions of scanner/controller 216 with respect to those keys or by programmed instructions causing processor 202 to disregard all signals representative of operation of those controls. In the HOURLY RATE MODE, the primary fare charge is calculated by processor 202 as a function of the elapsed time in that mode multiplied by the particular hourly rate value stored in ROM 220. Up to nine secondary charges for "personal services" may be added to the accrued hourly fare by means of "P. SERV" control key 36. When "P. SERV." control key 36 is depressed, a corresponding display element 50 is incremented to identify the number of personal services performed by the driver during the hire. Personal services data is received by processor 202 from scanner/controller 216, so that corresponding secondary fare charges can be added to the time-accrued fare by processor 202 and in turn displayed at fare display 32.

The preferred embodiment of the fare computer as shown in FIG. 2 may be implemented using an Intel 8085 single package microprocessor as processor 202. The 8085 microprocessor preferably is provided with a four MHz crystal serving as an internal clock, while real time and system clock 206 preferably comprises a 32.768 KHz real-time clock. An assembly language program, suitable for permanent storage into ROM 220, for controlling the operation of the 8085 microprocessor in calculating the accrued fares and in displaying all fare charges is as follows:

```
;;;;;;;;;;;;;;;;;;;;;;;;;;;;;;;;;;;;;;;;;;;;;;;;;;;;;
;            TAXI.ASM
;
;            3/2/85
;
;     PROGRAM FOR TAXI CAB RATE TIME DISPLAY
;
;
;
;
;      1/26/85 TEST DISPLAY BOARD
;      2/8/85 ADD REST OF TRANSLATION
;             IN ROW 6 AND ADD
;             RUSH IND AND RATE
;      2/24/85 ADD TIMING REGISTERS
;      2/27/85 ADD PARAMETER BLOCK FOR SCAN ROW PROCESSING
;      3/2/85 ADD IGNORE FOR HR AND WAIT AFTER SECOND HIT
;
;
;
;
;       SCAN ROW ASSIGNMENTS
;       ROW 4-    0-ZONE 1
;          1-     2
;          2-     3
;          3-     4
;          4-     5
;          5-
;          6-
```

```
!        7-HOURLY RATE
!        ROW 5-   0-ZONE A
!           1-     B
!           2-     C
!           3-     D
!           4-     E
!           5-     F
!           6-     G
!           7-     H
!        ROW 6-   0- PASSENGERS
!           1- BAGGAGE
!           2-TRUNKS
!           3-N.A.
!           4-PERSONAL SERVICE
!           5-TEL CALL
!           6-FET
!           7-WAITING
!        ROW 7-   0-N.A.
!           1-N.A.
!           2-N.A.
!           3-N.A.
!           4-N.A.
!           5-N.A.
!           6-N.A.
!           7-RESET
!
!    DISPLAY OUTPUT ASSIGNMENTS
!
!CATHODE 0-    FARE DOLLARS TENS
!        1-    FARE DOLLARS UNITS
!        2-    FARE CENTS TENS
!        3-    FARE CENTS UNITS
!        4-    HOURS TENS
!        5-    HOURS UNITS
!        6-    MINUTES TENS
!        7-    MINUTES UNITS
!        8- BIT0- PM MARKER
!        1- ELAPSED TIME DISPLAY MARKER
!        2- RUSH HOUR RATE
!        3- HOURLY RATE MARKER
!        4- PERSONAL SERVICE MARKER
!        5- TEL CALL MARKER
!        6- FET
!        7- FET 2
!        9-UNASSIGNED
!        10- NO. OF TRUNKS DISP
!        11- BAGGAGE DISP
!        12- NO. PASSENGERS DISP
!        13- ZONE LEDS A,B,C,D,E,F,G,H
!        14- ZONE LEDS 1,2,3,4,5
!        15- BIT 0-WAITING LED
!        1-
!        2-
!        3-
!        4-
!        5-
!        6-
!        7-
```

```
;
;
;       BASIC FIXED ASSIGNMENTS
;
;       ADD     EN      PORT            ADD     EN      PORT
;
;       40-4F   4       DISPLAY CONTROLLER (S279)
;       E0-EF   E       PA0,PB0,PC0 & INT TIMER
;                                       (8155)
;               INP     PA0     SWITCHS FOR CLOCKSET
;               OUT     PB0     BIT 0-CLOCK A0
;                                   1-       A1
;                                   2-       A2
;                                   3-       A3
;                                   4-       WR
;                                   5-       RD
;                                   6-
;                                   7-HOLD FOR MEMBOX
;                                       & CE
;               INP     PC0     BIT 0-CLOCK D0
;                                   1-       D1
;                                   2-       D2
;                                   3-       D3
;                                   4-
;                                   5-
;
;;;;;;;;;;;;;;;;;;;;;;;;;;;;;;;;;;;;;;;;;;;;;;;
0000 =          FALSE:  EQU     0
FFFF =          TRUE:   EQU     NOT FALSE
                ;
                ;
                ;
0000 =          TESTDUMP:       EQU     FALSE           ;ELIMINATE CODE SPACE IF
                                                        ;NOT DUMPING TEST SPACE
                ;
                ;

0000 =          HOST:   EQU     FALSE   ;ASSEMBLE FOR HOST COMP
0000 =          CR355:  EQU     FALSE
FFFF =          CR400:  EQU     TRUE    ;CRYSTAL FREQ
0000 =          DISPLAY:        EQU     FALSE
FFFF =          CLOCK:  EQU     TRUE    ;CLOCK CARD IN
0000 =          TALKER: EQU     FALSE   ;DIGITALKER BOARD
F000 =          DISPRAM:        EQU     0F000H  ;DISPLAY RAM ADDRESS
                ;
                ;
00F7 =          DR6ACT: EQU     0F7H
0080 =          DR7ACT: EQU     080H
                ;
                ;
                SIM     MACRO
                        DB 30H
                        ENDM
                RIM     MACRO
                        DB 20H
                        ENDM
                                ;INSERT FIXED ASSIGNMENTS HERE
                                ;INSERT INIT DATA FOR PORTS HERE
```

```
0CE0 =          PINIT0:  EQU      0E0H         ;COMMAND PORT ADDRESS
00C2 =          PDAT0:   EQU      0C2H         ;PA&PB INPUT & START TIMER
                                               ;PC OUTPUT
                                               ;INSERT ROW ADDRESSES HERE

0041 =          DINIT0:  EQU      41H          ;8279 ADDRESS
                ;
                ;
                         IF HOST
                         ORG 0100H
                         ELSE
0000                     ORG 0000H
                         ENDIF

0000 C30400     START:   JMP INIT
                                  ;
                                  ;INITIALIZE TIMERS AND PORTS
                                  ;AND ZERO RAM
                                  ;
                                  ;
                PARK:    IF HOST        ;WAIT FOR NEXT SMS
                                        ;IF ON BOARD WAIT FOR RST 7.5
                                        ;IF HOST WATCH 555 TIMER
                                        ;BIT 7 PORT 0

IN 0
                         ORA A
                         JP $-3
                         IN 0
                         ORA A
                         JM $-3
                         CALL D010M
                         ELSE
0003 FB                  EI
0004 76                  HLT
                         ENDIF
0005 C30300              JMP PARK       ;
0008 C1         REST75:  POP B          ;RESTORE REGISTERS FROM INTERUPT
0009 D1                  POP D
000A E1                  POP H
000B F1                  POP PSW
000C FB                  EI
000D C9                  RET            ;GETS BACK TO PARK OR INT ROUTINE
                                  ;
                         IF HOST
                         ORG 13CH
                         ELSE
0034                     ORG 034H       ;RST 6.5
0034 C9                  RET            ;FOR SANITY
003C                     ORG 03CH       ;RST 7.5
                         ENDIF
003C F5         D010M:   PUSH PSW
003D E5                  PUSH H
003E D5                  PUSH D
003F C5                  PUSH B
0040 210800              LXI H,REST75
```

```
0043 E5              PUSH H           ;RETURN ADD TO STACK
0044 FB              EI
0045 210020          LXI H, IND10     ;HERE EVERY 10 MS FROM PARA
0048 7E              MOV A,M
0049 4F              MOV C,A
004A 0600            MVI B,0
004C 3C              INR A
004D FE14            CPI 20
004F C25300          JNZ $+4
0052 AF              XRA A
0053 77              MOV M,A
0054 21BC09          LXI H,JOB10
0057 09              DAD B
0058 7E              MOV A,M          ;GET JOB BITS
0059 B7      D10M1:  ORA A
005A C8              RZ               ;WAIT FOR NEXT 10 MS
005B CDC903          CALL ZRFO
005E 320320          STA SAV10
0061 21D009          LXI H,VEC10
0064 CDB700          CALL ADD2        ;GET NEXT JOB BIT
0067 3A0320          LDA SAV10
006A C35900          JMP D10M1
006D 210120  D100M:  LXI H, IND100
0070 CDAD00          CALL ADD1
0073 77              MOV M,A
0074 21E009          LXI H,JOB100
0077 09              DAD B
0078 7E              MOV A,M
0079 B7      D100M1: ORA A
007A C8              RZ
007B CDC903          CALL ZRFO
007E 320420          STA SAV100
0081 21EA09          LXI H,VEC100
0084 CDB700          CALL ADD2
0087 3A0420          LDA SAV100
008A C37900          JMP D100M1
008D 210220  D01S:   LXI H, IND1S
0090 CDAD00          CALL ADD1
0093 77              MOV M,A
0094 21FA09          LXI H,JOB1S
0097 09              DAD B
0098 7E              MOV A,M          ;JOB BITS IN A
0099 B7      D1S1:   ORA A
009A C8              RZ
009B CDC903          CALL ZRFO        ;GET JOB BIT
009E 320520          STA SAV1S        ;SAVE REMAINING
00A1 21040A          LXI H,VEC1S      ;VECTOR BASE
00A4 CDB700          CALL ADD2
00A7 3A0520          LDA SAV1S
00AA C39900          JMP D1S1
00AD 7E      ADD1:   MOV A,M
00AE 4F              MOV C,A
00AF 0600            MVI B,0
00B1 3C              INR A
00B2 FE0A            CPI 0AH
00B4 C0              RNZ
00B5 AF              XRA A
```

```
00B6 C9              RET
00B7 48      A002:   MOV C,B
00B8 0600            MVI B,0
00BA 09              DAD B
00BB 09              DAD B
00BC 5E              MOV E,M
00BD 23              INX H
00BE 56              MOV D,M
00BF EB              XCHG
00C0 C3C300          JMP DOJOB
00C3 E9      DOJOB:  PCHL
00C4 F3      INIT:   DI
00C5 31FF27          LXI SP,27FFH    ;TOP OF RAM
00C8 21FF27          LXI H,27FFH
00CB 0608            MVI B,8         ;LOOP COUNT
00CD 3600    INIT1:  MVI M,0
00CF 2D              DCR L
00D0 C2CD00          JNZ $-3
00D3 25              DCR H
00D4 05              DCR B
00D5 C2CD00          JNZ INIT1
                     IF HOST
                     MVI A,146       ;MAKE PORT 0 INPUT
                     OUT 3
                     ENDIF
00D8 3E40            MVI A,40H
                     SIM             ;SOD LOW TRIGGER SANITY TIMER
00DA+30              DB 30H
00DE E3              XTHL
00DD E3              XTHL
00DD 3EC0            MVI A,0C0H      ;SOD HIGH
                     SIM
00DF+30              DB 30H
01E0 3E0C            MVI A,0CH
00E2 D341            OUT DINITO      ;DISP MODE LEFT ENTRY
                                     ;SENSOR MATRIX
00E4 3EC1            MVI A,0C1H
00E6 D341            OUT DINITO      ;CLEAR
00E8 3E50            MVI A,50H       ;READ DISP FIFO
00EA D341            OUT DINITO
00EC 3E90            MVI A,90H
00EE D341            OUT DINITO      ;WR +INC FROM ROW 0
00F0 3E34            MVI A,34H       ;/20 FOR 4.0 MHZ
00F2 D341            OUT DINITO      ;PRESCALER TO 100KC

00F4 3E67            MVI A,67H       ;5MS   4.00 MHZ
00F6 D3E5            OUT 0E5H
00F8 3E0C            MVI A,0CH
00FA D3E4            OUT 0E4H
                     ;
                     ;
00FC 3E01            MVI A,1
00FE 321C20          STA NPASS       ;DEFAULT NO OF PASS TO 1
                     ;
0101 3EC2            MVI A,PDAT0
0103 D3E0            OUT PINIT0      ;INITIALIZE PORTS
                     ;
                     ;
```

```
0105 3E0B              MVI A,0BH
                       SIM              ;ALLOW RST 7.5
0107+30                DB 30H

;##################################
                       ;#### SET ANY INTERRUPT MASKS HERE
                       ;#### BIT0=0 ALLOW RST 5.5
                       ;#### BIT1=0 ALLOW RST 6.5 VERT SYNC
                       ;#### BIT2=0 ALLOW RST 7.5 10 MS INTERRUPT
                       ;#### BIT3=1 MASK SET ENABLE

0108 FB                EI

0109 C30300            JMP PARK         ;WAIT FOR 10MS EDGE

SANITY:  IF NOT HOST
010C F3                DI
010D 3E40              MVI A,40H        ;TRIGGER GATE 2 SANITY TIMER
                       SIM              ;LOW
010F+30                DB 30H
0110 0610              MVI B,010H
0112 E3       SAN1:    XTHL
0113 E3                XTHL
0114 05                DCR B
0115 C21201            JNZ SAN1
0118 3EC0              MVI A,0C0H
                       SIM              ;HIGH
011A+30                DB 30H
011B FB                EI
                       ENDIF

011C C9                RET 011D 3A0620   WON:     LDA OUTDATO
0120 F601              ORI 01           ;TURN ON TEST LAMP
0122 320620            STA OUTDATO      ;SAVE OUTPUT ROW BITS
0125 D310              OUT 10H
0127 C9                RET
0128 3A0620   WOFF:    LDA OUTDATO
012B E6FE              ANI 0FEH
012D 320620            STA OUTDATO
0130 D310              OUT 10H          ;TURN OFF TEST LAMP
0132 C9                RET

;AND LOAD INTO HOLDING AREA

0133 C1       REST65:  POP B            ;RESTORE REGISTERS FROM INT 6.5
0134 D1                POP D
0135 E1                POP H
0136 F1                POP PSW
0137 C9                RET              ;RETURN TO INTERUPTED ROUTINE
                       ;
                       ;##################################################
                       ;
                       ;
                       ;
              CLKRD:
```

```
013B 0E20              MVI C,20H
0134 CD6302            CALL BSET
013D CD4A02            CALL HOLDDLY
0140 211120            LXI H,TIMADD+7
0143 0E00              MVI C,0         ;SECONDS UNITS
0145 CD3602            CALL CLKSUB
0148 0E01              MVI C,1         ;SEC TENS
014A CD3602            CALL CLKSUB
014D 363A              MVI M,3AH
014F 2B                DCX H
0150 0E02              MVI C,2         ;MIN U
0152 CD3602            CALL CLKSUB
0155 0E07              MVI C,7         ;DISP POSITION
0157 CD8D02            CALL TIMEDISP
015A 0E03              MVI C,03H       ;MIN T
015C CD3602            CALL CLKSUB
015F 0E06              MVI C,6
0161 CD8D02            CALL TIMEDISP
0164 363A              MVI M,3AH
0166 2B                DCX H
0167 0E04              MVI C,4         ;HR U
0169 CD3602            CALL CLKSUB
016C 0E05              MVI C,5
016E CD8D02            CALL TIMEDISP
0171 0E05              MVI C,05H
0173 CD3602            CALL CLKSUB
0176 C5                PUSH B
0177 F5                PUSH PSW
0178 E604              ANI 04
017A 3E01              MVI A,01        ;BIT 0
017C 0E08              MVI C,8 ;ROW 8
017E 47                MOV B,A
017F 3A6120            LDA GFLAGS1     ;GENERAL FLAGS
0182 C29101            JNZ LITEPM
0185 E6FD              ANI 0FDH
0187 326120            STA GFLAGS1     ;PM BIT
018A 78                MOV A,B
018B CD9604            CALL DARKBIT
018E C39A01            JMP CLKCONT
0191 F602      LITEPM: ORI 2
0193 326120            STA GFLAGS1
0196 78                MOV A,B
0197 CD6F04            CALL LIGHTBIT
019A F1        CLKCONT:    POP PSW
019B C1                POP B
019C E633              ANI 33H
019E F5                PUSH PSW
019F 0E04              MVI C,4
01A1 CD8D02            CALL TIMEDISP
01A4 F1                POP PSW
01A5 23                INX H
01A6 77                MOV M,A
01A7 211B20            LXI H,DTEADD+9
01AA 0E0B              MVI C,0BH       ;YR U
01AC CD3602            CALL CLKSUB
01AF 0E0C              MVI C,0CH       ;YR T
01B1 CD3602            CALL CLKSUB
01B4 362F              MVI M,2FH
```

```
0186 2B              DCX H
0187 0E07            MVI C,07H           ;DAY U
0189 CD3602          CALL CLKSUB
018C 0E08            MVI C,08            ;D T
018E CD3602          CALL CLKSUB
01C1 23              INX H
01C2 E633            ANI 33H
01C4 77              MOV M,A
01C5 2B              DCX H
01C6 362F            MVI M,2FH
01C8 2B              DCX H
01C9 0E09            MVI C,9H
01CB CD3602          CALL CLKSUB
01CE 0E0A            MVI C,0AH
01D0 CD3602          CALL CLKSUB
01D3 0E06            MVI C,6
01D5 CD3602          CALL CLKSUB         ;DAY OF WEEK
01D8 212602  CHKRUSH:    LXI H,RUSHRET
01DB E5              PUSH H    ;RET ADD
01DC 211320          LXI H,DTEADD+1
01DF 7E              MOV A,M
01E0 E607            ANI 07
01E2 47              MOV B,A
01E3 C8              RZ
01E4 78              MOV A,B
01E5 FE06            CPI 6
01E7 C8              RZ
01E8 210A20          LXI H,TIMADD
01EB 3A6120          LDA GFLAGS1
01EE E602            ANI 2
01F0 C8              RZ        ;PM?
01F1 7E              MOV A,M
01F2 E601            ANI 1
01F4 C0              RNZ       ;HR TENS
01F5 23              INX H     ;HR U
01F6 7E              MOV A,M
01F7 E60F            ANI 0FH
01F9 FE04            CPI 4
01FB D8              RC        ;>4?
01FC FE07            CPI 7
01FE D0              RNC       ;<7?
01FF FE06            CPI 6     ;=6PM?
0201 C21502          JNZ RUSHSET
0204 23              INX H
0205 23              INX H     ;MIN T
0206 7E              MOV A,M
0207 E607            ANI 07
0209 FE04            CPI 4
020B D0              RNC       ;>=40
020C FE03            CPI 3
020E C21502          JNZ RUSHSET
0211 23              INX H     ;MIN U
0212 E60F            ANI 0FH
0214 C0              RNZ
             RUSHSET:
0215 E1              POP H     ;KILL RET
0216 3A6120          LDA GFLAGS1
```

```
0219 F602              ORI 2
021B 326120            STA GFLAGS1
021E 3E04              MVI A,4
0220 0E08              MVI C,8
0222 CD6F04            CALL LIGHTBIT
0225 C9                RET
              RUSHRET:
                       ;HERE THRU STACK
                       ;
0226 3A6120            LDA GFLAGS1
0229 E6FD              ANI 0FDH
022B 326120            STA GFLAGS1
022E 3E04              MVI A,4
0230 0E08              MVI C,8
0232 CD9604            CALL DARKBIT
0235 C9                RET
0236 3A0620   CLKSUB:  LDA OUTDAT0
0239 E6F0              ANI 0F0H
023B B1                ORA C
023C 320620            STA OUTDAT0
023F D3E2              OUT 0E2H        ;SET A2D
0241 DBE3              IN 0E3H
0243 E60F              ANI 0FH
0245 F630              ORI 30H
0247 77                MOV M,A
0248 2B                DCX H
0249 C9                RET
024A 215D02   HOLDDLY: LXI H,ENDHOLD
024D E3                XTHL
024E E5                PUSH H
024F 0E80              MVI C,80H
0251 CD6302            CALL BSET
0254 0607              MVI B,7
0256 E3       CLKDLY:  XTHL
0257 E3                XTHL
0258 05                DCR B
0259 C25602            JNZ CLKDLY      ;DELAY 150 USEC
025C C9                RET
              ENDHOLD:
025D 0E7F              MVI C,7FH       ;HERE THROUGH STACK
025F CD6D02            CALL BRESET
0262 C9                RET
0263 3A0620   BSET:    LDA OUTDAT0
0266 B1                ORA C
0267 320620            STA OUTDAT0
026A D3E2              OUT 0E2H
026C C9                RET
026D 3A0620   BRESET:  LDA OUTDAT0
0270 A1                ANA C
0271 320620            STA OUTDAT0
0274 D3E2              OUT 0E2H
0276 C9                RET
0277 07       CLKSH1:  RLC
0278 07                RLC
0279 07                RLC
027A 07                RLC
027B E6F0              ANI 0F0H
```

```
027D B1              ORA C
027E C9              RET
027F 79      CLKSH2: MOV A,C
0280 0F              RRC
0281 0F              RRC
0282 0F              RRC
0283 0F              RRC
0284 E60F            ANI 0FH
0286 C9              RET
0287 0E3F    CLKTST: MVI C,3FH
0289 CD6302          CALL BSET
028C C9              RET
             ;
             ;
             ;
             ;        TIME DISPLAY
             ;
             ;LOADS DISPLAY REGISTER WITH SEVEN
             ;SEG DATA TO BE SENT TO DISPLAY
             ; HERE FROM CLKRD
             ;
             ;           C=INDEX TO DISPLAY CHAR
             ;        A=ASCII EQIV OF NUMB TO DISP
             ; H SAVED
             ;
             ;
             TIMEDISP:
028D E60F            ANI 0FH ;MASK ASCII
028F 47              MOV B,A
0290 B7              ORA A   ;CLEAR C
0291 3A2620          LDA DSCNDAT0+5 ;CHECK SWITCH 0
0294 0F              RRC
0295 D29A02          JNC TDISP1     ;SETTING CLOCK IF SW ACT
0298 B7              ORA A
0299 C0              RNZ
029A 78      TDISP1: MOV A,B
029B CD9F02          CALL LOADDISP
029E C9              RET
             ;
             ; A=DATA
             ; ROUTINE INDEXES DISPLAY BUFFER AND CONVERTS
             ; DATA TO SEVEN SEG DATA AND PLACES IN BUFF
             ; C=INDEX (DISP CATHODE #)
             LOADDISP:
029F E5              PUSH H
02A0 D5              PUSH D
02A1 C5              PUSH B
02A2 212920          LXI H,DISPDAT0         ;BUFFER
02A5 11DEC9          LXI D,DIGITRN          ;TRANSLATE TABLE
02A8 0600            MVI B,0
02AA 09              DAD B   ;BUFFER POSITION
02AB E60F            ANI 0FH ;DATA
02AD 83              ADD E
02AE 5F              MOV E,A
02AF D2B302          JNC $+4
02B2 14              INR D
02B3 1A              LDAX D ;SEVEN SEG DAT
02B4 77              MOV M,A ;WR TO BUFF
```

```
02E5 C1              POP B
02E6 D1              POP D
02E7 E1              POP H
02E8 C9              RET
02E9 3A2620  CLKSET: LDA DSCNDAT0+5
                              ;ROW TO READ
                              ;
                              ;BIT 0 IS CLOCKSET ENABLE
                              ;BIT 1 IS MIN SET
                              ;BIT 2 IS HOUR SET
                              ;BIT 3 IS DAY SET
                              ;BIT 4 IS MONTH SET
                              ;BIT 5 IS YEAR UNITS
                              ;BIT 6 IS DAY OF WEEK
                              ;
                              ;
02EC 1F              RAR
02ED D0              RNC
02EE 57              MOV D,A
02EF B7              ORA A
02C0 C8              RZ      ;NEED AT LEAST 2
02C1 0E04            MVI C,4
02C3 AF              XRA A
02C4 CD9F02          CALL LOADDISP
02C7 0E05            MVI C,5 ;CATHODE 5
02C9 AF              XRA A
02CA CD9F02          CALL LOADDISP
02CD 7A              MOV A,D
02CE E6FF            ANI 0FFH
02D0 FE3F            CPI 3FH
02D2 CA8702          JZ CLKTST
02D5 CD4A02          CALL HOLDDLY
02D8 7A              MOV A,D
02D9 F5              PUSH PSW
02DA 3E02            MVI A,02
02DC D3E0            OUT 0E0H    ;SET INPUT
02DE F1              POP PSW
02DF E63F            ANI 03FH            ;MASK SET BITS
02E1 1F              RAR
02E2 D2ED02          JNC HRSET
02E5 0E02    RDMIN:  MVI C,2 ;MIN
02E7 117F59          LXI D,597FH
02EA C32703          JMP SETSUB
02ED 1F      HRSET:  RAR
02EE D2F902          JNC DAYSET  ;NO HOURS FLAG IF NO CARRY
02F1 0E04            MVI C,4
02F3 117F11          LXI D,117FH
02F6 C32703          JMP SETSUB
02F9 1F      DAYSET: RAR
02FA D20503          JNC MONSET
02FD 0E07            MVI C,7
02FF 113F31          LXI D,313FH
0302 C32703          JMP SETSUB
0305 1F      MONSET: RAR
0306 D21103          JNC YRSET
0309 0E09            MVI C,9
```

```
030B 111F12            LXI D,121FH
030E C32703            JMP SETSUB
0311 1F      YRSET:    RAR
0312 D21D03            JNC DOWSET
0315 0E06              MVI C,08H
0317 11FF99            LXI D,99FFH
031A C32703            JMP SETSUB
             DOWSET:
                       ;DAY OF WEEK
                       ;
031D 1F                RAR
031E D0                RNC
031F 0E06              MVI C,6
0321 110706            LXI D,0607H
0324 C32703            JMP SETSUB
0327 3EA0    SETSUB:   MVI A,0A0H
0329 B1                ORA C
032A D3E2              OUT 0E2H
032C DBE3              IN 0E3H ;GET OLD LOWER
032E E60F              ANI 0FH
0330 47                MOV B,A
0331 0C                INR C
0332 3EA0              MVI A,0A0H
0334 B1                ORA C
0335 D3E2              OUT 0E2H
0337 DBE3              IN 0E3H ;GET OLD UPPER
0339 07                RLC
033A 07                RLC
033B 07                RLC
033C 07                RLC
033D E6F0              ANI 0F0H
033F B0                ORA B   ;COMBINE
0340 47                MOV B,A
0341 A3                ANA E   ;MSK
0342 BA                CMP D   ;END?
0343 DA7703            JC SETS2
                       ;C IF <LIMIT
0346 79                MOV A,C
0347 FE05              CPI 5
0349 3E00              MVI A,0
034B C27A03            JNZ SETS1    ;C=5 IF HRS
034E 78                MOV A,B
034F FE11              CPI 11H
0351 CA7203            JZ SETPM
0354 FE12              CPI 12H
0356 CA6803            JZ SET1AM
0359 FE51              CPI 51H
035B CA6D03            JZ SETAM
035E FE52              CPI 52H
0360 C27703            JNZ SETS2
0363 3E41              MVI A,41H
0365 C37A03            JMP SETS1
0368 3E01    SET1AM:   MVI A,1
036A C37A03            JMP SETS1
036D 3E12    SETAM:    MVI A,12H
036F C37A03            JMP SETS1
```

```
0372 3E52      SETPM:   MVI A,52H
0374 C37A03             JMP SETS1
0377 C601      SETS2:   ADI 1
0379 27                 DAA
037A 47        SETS1:   MOV B,A
037B 0F                 RRC
037C 0F                 RRC
037D 0F                 RRC
037E 0F                 RRC
037F E60F               ANI 0FH
0381 5F                 MOV E,A
0382 3E0E               MVI A,0EH
0384 D3E0               OUT 0E0H
0386 7B                 MOV A,E
0387 F5                 PUSH PSW
0388 C5                 PUSH B
0389 79                 MOV A,C
038A FE05               CPI 5    ;HRS IF 5
038C 7B                 MOV A,E
038D C29203             JNZ $+5
0390 E603               ANI 03H
0392 0E06               MVI C,6
0394 CD9F02             CALL LOADDISP
0397 C1                 POP B
0398 F1                 POP PSW
0399 D3E3               OUT 0E3H      ;SET UP DATA
039B 3E80               MVI A,80H
039D B1                 ORA C
039E D3E2               OUT 0E2H      ;ADD STABLE
03A0 F610               ORI 10H
03A2 D3E2               OUT 0E2H      ;WR H
03A4 E68F               ANI 08FH
03A6 D3E2               OUT 0E2H      ;WR L
03A8 0D                 DCR C
03A9 78                 MOV A,B
03AA E60F               ANI 0FH
03AC F5                 PUSH PSW
03AD C5                 PUSH B
03AE 0E07               MVI C,7 ;DISPLAY CHAR
03B0 CD9F02             CALL LOADDISP
03B3 C1                 POP B
03B4 F1                 POP PSW
03B5 D3E3               OUT 0E3H
03B7 3E80               MVI A,80H
03B9 B1                 ORA C
03BA D3E2               OUT 0E2H      ;ADD STABLE
03BC F610               ORI 10H
03BE D3E2               OUT 0E2H      ;WR H
03C0 E68F               ANI 8FH
03C1 D3E2               OUT 0E2H      ;WR L
03C4 3E02               MVI A,02H
03C6 D3E0               OUT 0E0H
03C8 C9                 RET
                        ;
                        ;
```

```
                ;
                ;
                ;
                                        ;
                                        ;
03C9 D5     ZRFO:   PUSH D              ;ZEROS RIGHTMOST FIRST ONE IN 'A'
                                        ;AND PLACES VALUE OF BIT IN 'E'
03CA 0600           MVI B,0
03CC 1F             RAR
03CD DAD403         JC $+7
03D0 04             INR B
03D1 C3CC03         JMP $-5
03D4 50             MOV D,B
03D5 14             INR D
03D6 3F             CMC
03D7 07             RLC
03D8 15             DCR D
03D9 C2D703         JNZ $-2
03DC B7             ORA A   ;SET ZERO FLAG
03DD D1             POP D
03DE C9             RET
                ;
                ;
                TESTD:
                        IF  TESTDUMP
                        LXI H,0F003H
                        MVI M,20H
                        INX H
                        MVI M,20H
                        INX H
                        MVI B,30
                        LXI D,MINREGS
                TESTD1:
                        LDAX D
                        PUSH D
                        CALL TESTWR
                        POP D
                        INX D
                        DCR B
                        JNZ TESTD1
                        RET
                ;
                        LDA TEST0
                        CALL TESTWR
                        LDA TEST1
                        CALL TESTWR
                        LDA TEST2
                        CALL TESTWR
                        LDA TEST3
                        CALL TESTWR
                        RET
                TESTWR: MOV E,A
                        RRC
```

```
                    RRC
                    RRC
                    RRC
                    ANI 0FH
                    CPI 0AH
                    JNC TLET
                    ORI 30H
                    JMP $+5
            TLET:   ADI 37H
                    MOV M,A
                    INX H
                    MOV A,E
                    ANI 0FH
                    CPI 0AH
                    JNC TLET1
                    ORI 30H
                    JMP $+5
            TLET1:  ADI 37H
                    MOV M,A
                    INX H
                    MVI M,20H
                    INX H
                    MVI M,20H
                    ENDIF
03DF C9             RET
                    ;
                    ;

03E0 3EE0   DSCAN:  MVI A,0E0H
03E2 D341           OUT DINIT0        ;CLEAR INT FLAG
03E4 3E50           MVI A,50H
03E6 D341           OUT DINIT0        ;SET SCAN READ ROW TO 0
03E8 212120         LXI H,DSCNDATO    ;DATA HOLD AREA
03EB 0608           MVI B,8
03ED DB40   DSCN1:  IN DINIT0-1       ;READ ROW
03EF 77             MOV M,A
03F0 23             INX H
03F1 05             DCR B
03F2 C2ED03         JNZ DSCN1
                    ;
                    ;
                    ;
                    ;     CHECK SCAN ROW FOR CHANGES AND PROCESS
                    ;       1-0
                    ;       0-1
                    ;
                    ;P.S. AND MASK XOR LL=CHANGES +P.S. MASK =0-1CHANGES
                    ;CMA AND MASK CHANGES=1-0
                    ;ENTER A=SCAN H=ROW PARAMETER BLOCK
                    ;           BYTE 0-ACTIVITY BITS
                    ;                1,2-ADDRESS OF DATA BLOCK
                    ;                3,4-POINTER TO CLIENT TABLE 0>1
                    ;                1-0 CHANGES=0>1 +16
                    ;
                    ;           DATA BLOCK-0-VARIABLE ACTIVITY BITS COMP(0=ACT)
                    ;                     1-LAST LOOK
```

```
;                   2-0>1 CHANGES
;
;
            DCHKSCAN:
                        IRPC ?X,467     ;SCAN ROWS
                        LDA DSCNDAT0+&?X
                        LXI H,R&?X&PB
                        CALL DO$DSCAN
                        ENDM
03F5+3A2520             LDA DSCNDAT0+4
03F8+213309             LXI H,R4PB
03FB+CD1104             CALL DO$DSCAN
03FE+3A2720             LDA DSCNDAT0+6
0401+213D09             LXI H,R6PB
0404+CD1104             CALL DO$DSCAN
0407+3A2820             LDA DSCNDAT0+7
040A+214209             LXI H,R7PB
040D+CD1104             CALL DO$DSCAN
0410 C9                 RET
                        ;---------*********************************************

;
;
;
;SCAN ROW 0>1 1<0 PROCESSING
;
;
            DO$DSCAN:
0411 47                 MOV B,A     ;P.S
0412 7E                 MOV A,M     ;FIXED ACTIVITY BITS 1=ACTIVE
0413 A0                 ANA B
0414 47                 MOV B,A     ;ACT P.S
0415 23                 INX H       ;POINT TO DATA BLOCK ADDRESS
0416 5E                 MOV E,M
0417 23                 INX H
0418 56                 MOV D,M
                                    ;D=VARIABLE BLOCK ADDRESS
0419 1A                 LDAX D      ;A=COMP OF VARIABLE MASK
041A 2F                 CMA
041B A0                 ANA B       ;MASK WITH FIXED MASK
041C 47                 MOV B,A     ;HOLD
041D 13                 INX D
041E 1A                 LDAX D      ;GET LAST LOOK
041F 4F                 MOV C,A
0420 78                 MOV A,B
0421 12                 STAX D      ;UPDATE LAST LOOK
                                    ;LL=FS
                                    ;
                                    ;B=MASKED FS
                                    ;C=LL
                                    ;A=MASKED PS
0422 A9                 XRA C       ;A=CHANGES
0423 F5                 PUSH PSW
0424 A0                 ANA B       ;A=0-1CHANGES
0425 13                 INX D       ;POINT TO 0>1 CHANGES
0426 12                 STAX D      ;SAVE
```

```
0427 F1              POP PSW
0428 D5              PUSH D
0429 5F              MOV E,A      ;CHANGES TO E
042A 78              MOV A,B
042B AB              XRA E        ;A=1-0CHANGES 042C 23              INX H
042D 5E              MOV E,M      ;GET 0>1 CLIENT BASE
042E 23              INX H
042F 56              MOV D,M
0430 EB              XCHG
0431 D1              POP D        ;D= POINT TO 0>1 CHGS
                                  ;H=POINTER TO 0>1 CLIENT BASE

0432 B7              ORA A        ;PROCESS 1-0 FIRST
0433 CA3D04          JZ DSCAN01   ;IF NONE PROCESS 0>1

;FINISHED WITH VARIABLE BLOCK IF HERE
0436 111000          LXI D,10H    ;SIXTEEN WORDS IN BLOCK
0439 19              DAD D        ;H=CLIENT BASE FOR 1>0 CHGS
043A CD4404          CALL DOROWCGS
            ;
            ;
            ;PROCESS 0>1 CHANGES
            ;
            DSCAN01:
043D 1A              LDAX D       ;GET 0-1 CHANGES
043E B7              ORA A
043F C8              RZ           ;NONE TO DO IF ZERO
0440 CD4404          CALL DOROWCGS
0443 C9              RET
            DOROWCGS:
0444 E5              PUSH H       ;SAVE CLIENT BASE ADDRESS
0445 CDC903          CALL ZRFO
0448 F5              PUSH PSW
0449 78              MOV A,B
044A 07              RLC
044B E6FE            ANI 0FEH     ;*2
044D 4F              MOV C,A
044E 0600            MVI B,0
0450 09              DAD B
0451 115A04          LXI D,DOROWCGSRET
0454 D5              PUSH D       ;RET TO STACK
0455 5E              MOV E,M
0456 23              INX H
0457 56              MOV D,M
0458 EB              XCHG
0459 E9              PCHL         ;TO ROUTINE
            DOROWCGSRET:
045A F1              POP PSW      ;GET REST TO DO BACK
045B E1              POP H        ;GET CLIENT BASE BACK
045C B7              ORA A
045D C8              RZ
```

```
045E C34404         JMP DOROWCSS      ;DO NEXT
                    ;
                    ;
                    ;
                    ;C=ROW TO CHANGE
                    ;A=BITS TO LIGHT
                    ;
                    FLASH60:
0461 E5             PUSH H
0462 213E20         LXI H,FLSH60
0465 C37304         JMP DSETBIT
                    FLASH120:
0468 E5             PUSH H
0469 214E20         LXI H,FLSH120
046C C37304         JMP DSETBIT
                    LIGHTBIT:
046F E5             PUSH H
0470 212920         LXI H,DISPDAT0
                    DSETBIT:
0473 D5             PUSH D
0474 C5             PUSH B
0475 0600           MVI B,0
0477 09             DAD B
0478 47             MOV B,A
0479 7E             MOV A,M
047A B0             ORA B
047B 77             MOV M,A
047C C1             POP B
047D D1             POP D
047E E1             POP H
047F C9             RET
                    ;
                    ;
                    ;C=ROW TO CHANGE
                    ;A=BITS TO PUT OUT
                    ;
                    ;
                    NOFLASH60:
0481 CD9604         CALL DARKBIT      ;MAKE SURE BIT IS OUT
0483 2F             CMA
0484 E5             PUSH H
0485 213E20         LXI H,FLSH60
0488 C35A04         JMP DRESETBIT
                    NOFLASH120:
048B CD9604         CALL DARKBIT
048E 2F             CMA
048F E5             PUSH H
0490 214E20         LXI H,FLSH120
0493 C39A04         JMP DRESETBIT
                    DARKBIT:
0496 E5             PUSH H
0497 212920         LXI H,DISPDAT0
                    DRESETBIT:
049A D5             PUSH D
049B C5             PUSH B
```

```
049C 2F              CMA
049D 0600            MVI B,0
049F 09              DAD B
04A0 47              MOV B,A
04A1 7E              MOV A,M
04A2 A0              ANA B
04A3 77              MOV M,A ;UPDATE
04A4 C1              POP B
04A5 D1              POP D
04A6 E1              POP H
04A7 C9              RET
                ;
                ;ZONEFLAG
                ;       0-ORIGINATING ROW 4 RCVD
                ;       1-ORG           ROW 5 RCVD
                ;       2-TERMINATING ROW 4 RCVD
                ;       3-TERM    5 RCVD
                ;       4-HIGH NIBBLE FLAG FOR RATE TABLE READ
                ;              READ OF OFFH =ILLEGAL
                ;                          COMBINATION
                ;
                ;
                CHKZONE:
04A8 3A6120          LDA GFLAGS1
04AB E610            ANI 10H         ;NO ZONES WHILE ON HOURLY
04AD C0              RNZ
04AE 216620          LXI H,ZONEFLAG
04B1 0E01            MVI C,1
04B3 7E              MOV A,M
04B4 47              MOV B,A
04B5 A1              ANA C
04B6 C2E604          JNZ CHKORG1
                            ;LDA DSCNDATO+5
                            ;ORA A
                            ;JNZ ZBLANK
04B9 3A2520          LDA DSCNDATO+4
04BC E61F            ANI 1FH
04BE C8              RZ
04BF 5F              MOV E,A
04C0 C5              PUSH B
04C1 3A1C20          LDA NPASS
04C4 FE02            CPI 2           ;CHECK IF BUTTON ALREADY PUSHED
04C6 D2D004          JNC PASSIN
04C9 0E0C            MVI C,12        ;DISP POSIT
04CB 3E01            MVI A,1         ;SET INITIAL PASSENGERS TO 1
04CD CD9F02          CALL LOADDISP
04D0 C1       PASSIN: POP B
04D1 7B              MOV A,E
04D2 CDC903          CALL ZRFO
04D5 C2D305          JNZ ZBLANK
04D8 78              MOV A,B
04D9 323D20          STA ORGZONE+1
04DC 3E01            MVI A,1
04DE 77              MOV M,A ;ZONEFLAG
04DF 7B              MOV A,E
04E0 0E0E            MVI C,14
```

```
04E2 CD6F04         CALL LIGHTBIT
04E5 C9             RET
            CHKOFS1:
04E6 0E02           MVI C,2
04E8 78             MOV A,B ;ZONEFLAG
04E9 A1             ANA C
04EA C20C05         JNZ CHKTERM
04ED 3A2620         LDA DSCNDAT0+5
04F0 B7             ORA A
04F1 C8             RZ
04F2 5F             MOV E,A
04F3 CDC903         CALL ZRFO
04F6 C2D305         JNZ ZBLANK
04F9 78             MOV A,B ;BIT POSIT
04FA 07             RLC
04FB 07             RLC
04FC 07             RLC
04FD 07             RLC
04FE 07             RLC
04FF 323C20         STA ORGZONE
0502 7E             MOV A,M
0503 B1             ORA C
0504 77             MOV M,A
0505 7B             MOV A,E
0506 0E0D           MVI C,13
0508 CD6F04         CALL LIGHTBIT
050B C9             RET
050C 0E04   CHKTERM:  MVI C,4
050E 78             MOV A,B
050F A1             ANA C
0510 C23405         JNZ CHKTERM1
0513 3A2520         LDA DSCNDAT0+4
0516 B7             ORA A
0517 C8             RZ
0518 5F             MOV E,A
0519 CDC903         CALL ZRFO
051C C2D305         JNZ ZBLANK
051F 78             MOV A,B
0520 07             RLC
0521 07             RLC
0522 47             MOV B,A
0523 3A3C20         LDA ORGZONE
0526 B0             ORA B
0527 323C20         STA ORGZONE
052A 7E             MOV A,M
052B B1             ORA C
052C 77             MOV M,A
052D 7B             MOV A,E
052E 0E0E           MVI C,14
0530 CD6104         CALL FLASH60
0533 C9             RET
            CHKTERM1:
0534 0E08           MVI C,8
0536 78             MOV A,B
0537 A1             ANA C
0538 C0             RNZ
```

```
0539 3A2620          LDA DSCNDATO+5
053C B7              ORA A
053D C8              RZ
053E 5F              MOV E,A
053F CDC903          CALL ZRFO
0542 C2D305          JNZ ZBLANK
0545 78              MOV A,B
0546 37              STC
0547 3F              CMC      ;ZERO
0548 1F              RAR
0549 47              MOV B,A
054A D24F05          JNC $+5
054D 0E18            MVI C,18H     ;IF C HIGH NIBBLE
054F 3A3C20          LDA ORGZONE
0552 B0              ORA B    ;FINISH INDEX
0553 323C20          STA ORGZONE
0556 7E              MOV A,M
0557 B1              ORA C
0558 77              MOV M,A
0559 7B              MOV A,E
055A 0E0D            MVI C,13
055C CD6104          CALL FLASH60
055F 11140A          LXI D,TAXIRATE
0562 2A3C20          LHLD ORGZONE
0565 EB              XCHG
0566 19              DAD D
0567 46              MOV B,M
0568 3A6620          LDA ZONEFLAG
056B E610            ANI 10H
056D 78              MOV A,B
056E CA7505          JZ $+7  ;IF Z LOW NIBBLE
0571 0F              RRC
0572 0F              RRC
0573 0F              RRC
0574 0F              RRC
0575 E60F            ANI 0FH ;MASK
0577 FE0F            CPI 0FH
0579 CAC205          JZ BADRATE
057C 211809          LXI H,RATETBL
057F 0600            MVI B,0
0581 07              RLC
0582 4F              MOV C,A
0583 09              DAD B
0584 5E              MOV E,M ;TWO WORD TABLE
0585 23              INX H
0586 56              MOV D,M
                     ;***************ADD TO EXSISTING FARE HERE
                     ;
0587 EB              XCHG    ;AMOUNT TO HL
0588 CDF608          CALL ADDFARE
                     ;CHECK IF RUSH HOUR
058B 3A6120          LDA GFLAGS1
058E E602            ANI 02
0590 CA9305          JZ FAREDISP
0593 2AB009          LHLD RUSHRATE
0596 CDF608          CALL ADDFARE
```

```
                    ;DE=PACKED BCD FARE TO DISPLAY
                    ;
                    ;
0599 7B             FAREDISP:    MOV A,E
059A E60F                        ANI 0FH
059C 0E03                        MVI C,3
059E CD9F02                      CALL LOADDISP
05A1 7B                          MOV A,E
05A2 1F                          RAR
05A3 1F                          RAR
05A4 1F                          RAR
05A5 1F                          RAR
05A6 E60F                        ANI 0FH
05A8 0E02                        MVI C,2
05AA CD9F02                      CALL LOADDISP
05AD 7A                          MOV A,D
05AE E60F                        ANI 0FH
05B0 0E01                        MVI C,1
05B2 CD9F02                      CALL LOADDISP
05B5 7A                          MOV A,D
05B6 1F                          RAR
05B7 1F                          RAR
05B8 1F                          RAR
05B9 1F                          RAR
05BA E60F                        ANI 0FH
05BC 0E00                        MVI C,0
05BE CD9F02                      CALL LOADDISP
05C1 C9                          RET
                    BADRATE:
05C2 3E40                        MVI A,40H      ;FLASH SEG 9
05C4 47                          MOV B,A
05C5 0E03                        MVI C,3
05C7 1604                        MVI D,4  ;LOOP CNT
05C9 CD6804        BADFARE1:     CALL FLASH120
05CC 78                          MOV A,B
05CD 0D                          DCR C
05CE 15                          DCR D
05CF C2C905                      JNZ BADFARE1
05D2 C9                          RET
                    ZBLANK:
05D3 210000                      LXI H,0
05D6 AF                          XRA A
05D7 223C20                      SHLD ORGZONE
05DA 226720                      SHLD FARE
05DD 328720                      STA R4VAR
05E0 328A20                      STA R6VAR
05E3 326620                      STA ZONEFLAG
05E6 321E20                      STA NBAGS
05E9 321F20                      STA NTRNS
05EC 321D20                      STA NPETS
05EF 322020                      STA NPSERV
05F2 3C                          INR A
05F3 321C20                      STA NPASS
```

```
05F6 3A6120         LDA 6FLAGS1
05F9 E603           ANI 03H
05FB 326120         STA 6FLAGS1
05FE 010010         LXI B,1000H     ;CLEAN PANEL
0601 3EFF   ZBLANK1:    MVI A,0FFH
0603 CD7604         CALL DARKBIT
0606 2F             CMA
0607 CDB004         CALL NOFLASH60
060A 2F             CMA
060B CDBB04         CALL NOFLASH120
060E 0C             INR C
060F 05             DCR B
0610 C20106         JNZ ZBLANK1
0613 0605           MVI B,5
0615 110500         LXI D,5
0618 216B20         LXI H,MINREGS+2 ;TO
            ZBLANK3:                ;IDLE MINUTE REGS
061B 3600           MVI M,0
061D 19             DAD D
061E 05             DCR B
061F C21B06         JNZ ZBLANK3
0622 C9             RET

;
            DODISP:
0623 3E90           MVI A,90H
0625 D341           OUT DINIT0     ;SET DISP RAM TO ROW 0 AUTO INC
0627 212920         LXI H,DISPDAT0
062A 0610           MVI B,16
062C 7E     DODISP1:    MOV A,M ;SET DATA
062D D340           OUT DINIT0-1  ;SEND
062F 23             INX H
0630 05             DCR B
0631 C22C06         JNZ DODISP1
0634 C9             RET
0635 C9     DTEST:  RET
            ;
0636 3A3920         LDA SEQUENCE
0639 B7             ORA A
063A F24706         JP DTSTART
063D 3A2520         LDA DSCNDAT0+4
0640 FE81           CPI 81H
0642 C0             RNZ
0643 AF             XRA A
0644 323920         STA SEQUENCE
0647 3A3920 DTSTART:    LDA SEQUENCE
064A FE00           CPI 0
064C CA6806         JZ NODISP3
064F FE01           CPI 1
0651 CA6406         JZ NODISP2
0654 FE02           CPI 2
0656 CA6806         JZ NODISP3
0659 FE03           CPI 3
```

```
0658 CA6406            JZ NODISP2
065E 3E80              MVI A,80H
0660 323920            STA SEQUENCE
0663 C9                RET
0664 AF      NODISP2:  XRA A
0665 C36A06            JMP NODISP
0668 3EFF    NODISP3:  MVI A,0FFH
066A 212920  NODISP:   LXI H,DISPDATO
066D 0610              MVI B,16
066F 77      NODISP1:  MOV M,A
0670 23                INX H
0671 05                DCR B
0672 C26F06            JNZ NODISP1
0675 3A3920  NODISP4:  LDA SEQUENCE
0678 3C                INR A
0679 FE04              CPI 04H
067B C27F06            JNZ $+4
067E 3E80              MVI A,80H
0680 323920            STA SEQUENCE
0683 C9                RET

;
             ;
             ;FLASH ROUTINES
             ;60&120 IPM
             ;
             IPM60:
0684 213E20            LXI H,FLSH60
0687 0E00              MVI C,0
0689 0610              MVI B,16
068B 3A5E20            LDA FL660
068E B7                ORA A
068F 2F                CMA
0690 325E20            STA FL660
0693 CACA06            JZ OFF120
0696 C3BF06            JMP ON120
             IPM120:
0699 3A6020            LDA FLASHCNT
069C 3C                INR A
069D FE19              CPI 25  ;HERE EVERY 10MS
069F 326020            STA FLASHCNT
06A2 C0                RNZ
06A3 AF                XRA A
06A4 326020            STA FLASHCNT
06A7 214F20            LXI H,FLSH120
06AA 0E00              MVI C,0
06AC 0610              MVI B,16
06AE 3A5F20            LDA FL6120
06B1 B7                ORA A
06B2 2F                CMA
06B3 325F20            STA FL6120
06B6 CACA06            JZ OFF120
06B9 CDBF06            CALL ON120
06BC C38406            JMP IPM60
             ON120:
06BF 7E                MOV A,M
```

```
0600 CD6F04         CALL LIGHTBIT
0603 23             INX H
0604 0C             INR C
0605 05             DCR B
0606 C2BF06         JNZ ON120
0609 C9             RET
            OFF120:
060A 7E             MOV A,M
060B CD9604         CALL DARKBIT
060E 0C             INR C
060F 23             INX H
06D0 05             DCR B
06D1 C2CA06         JNZ OFF120
06D4 C9             RET
            PASSBUT:
06D5 3A1C20         LDA NPASS
06D8 FE09           CPI PASSLIMIT
06DA C8             RZ              ;IF AT LIMIT IGNORE FURTHER
06DB C601           ADI 1
06DD 27             DAA
06DE 321C20         STA NPASS
06E1 0E0C           MVI C,12
06E3 CD9F02         CALL LOADDISP
06E6 2AAE09         LHLD PASSRATE
06E9 CDF608         CALL ADDFARE
06EC C9             RET
06ED 3A1E20 BAGBUT: LDA NBAGS
06F0 FE09           CPI BAGLIMIT
06F2 C8             RZ
06F3 C601           ADI 1
06F5 27             DAA
06F6 321E20         STA NBAGS
06F9 0E0B           MVI C,11
06FB CD9F02         CALL LOADDISP
06FE 2AB209         LHLD BAGRATE
0701 CDF608         CALL ADDFARE
0704 C9             RET
0705 3A1F20 TRKBUT: LDA NTRKS
0708 FE05           CPI TRKLIMIT
070A C8             RZ
070B C601           ADI 1
070D 27             DAA
070E 321F20         STA NTRKS
0711 0E0A           MVI C,10
0713 CD9F02         CALL LOADDISP
0716 2AB409         LHLD TRKRATE
0719 CDF608         CALL ADDFARE
071C C9             RET
            PERSBUT:
071D 3A2020         LDA NPSERV
0720 FE09           CPI PERSLIMIT
0722 C8             RZ
0723 C601           ADI 1
0725 27             DAA
0726 322020         STA NPSERV
0729 2AAA09         LHLD PERSRATE
```

```
072C 3E10              MVI A,10H
072E 0E08     PBUT1:   MVI C,8
0730 CD6F04            CALL LIGHTBIT
0733 C3F608            JMP ADDFARE
              TELBUT:
0736 3A6120            LDA GFLAGS1
0739 47                MOV B,A
073A E604              ANI 04H
073C C0                RNZ
073D 78                MOV A,B
073E F604              ORI 04H
0740 326120            STA GFLAGS1
0743 3E20              MVI A,20H
0745 2AA809            LHLD TELRATE
0748 C32E07            JMP PBUT1
              PETBUT:
074B 3A1D20            LDA NPETS
074E FE02              CPI 2
0750 C8                RZ
0751 D0                RNC
0752 B7                ORA A
0753 CA6207            JZ PET1
0756 3C                INR A
0757 321D20            STA NFETS
075A 3EC0              MVI A,0C0H
075C 2AAC09    PET3:   LHLD PETRATE
075F C32E07            JMP PBUT1
0762 3C        PET1:   INR A
0763 321D20            STA NFETS
0766 3E40              MVI A,40H
0768 C35C07            JMP PET3
              RESBUT:
076B CDD305            CALL ZBLANK
076E C9                RET
              HRBUT:
076F 3A2520            LDA DSCNDAT0+4
0772 E67F              ANI 7FH         ;CHECK IF MORE THAN ONE SET IN FCW
0774 C0                RNZ             ;TOO MANY IF NOT ZERO
0775 3A6120            LDA GFLAGS1
0778 47                MOV B,A
0779 E608              ANI 8           ;CANT SET HOURLY WHILE WAITING
077B C0                RNZ
077C 78                MOV A,B
077D E610              ANI 10H
077F C2BA07            JNZ HRSTOP
0782 78                MOV A,B
0783 F610              ORI 10H
0785 326120            STA GFLAGS1     ;SET HOURLY RATE BIT
0788 3EEF              MVI A,0EFH      ;
078A 326A20            STA R6VAR       ;IGNORE ALL ON HOURLY EXCEPT PERS SERVICE
078D 21A707            LXI H,HRSEG1
0790 0E61              MVI C,61H
0792 CD4908            CALL SEIZEMIN   ;GET MIN TIMING REGISTER
0795 D8                RC              ;NONE AVAILABLE IF CARRY
0796 328620            STA HRREGNO     ;SAVE REGISTER INDEX
0799 3E08              MVI A,8
```

```
079B 0E08            MVI C,8
079D CD6804          CALL FLASH120
07A0 2AE609          LHLD HRRATE
07A3 CDF608          CALL ADDFARE
07A6 C9             RET
              HRSEG1:
07A7 21A707          LXI H,HRSEG1
07AA 0E15            MVI C,15H       ;TIME FOR 15 MIN
07AC CD4908          CALL SEIZEMIN
07AF D8              RC              ;NONE AVAILABLE IF CARRY
                                     ;THIS SHOULD BE IMPOSSIBLE
                                     ;SINCE WE DONOT USE MORE THAN
                                     ;TWO IN ENTIRE PROG AND 5 ARE
                                     ;ALLOCATED
                                     ;
07B0 328620          STA HRREGNO     ;SAVE REGISTER NUMBER FOR CANCEL
07B3 2AE809          LHLD HRRATEI
07B6 CDF608          CALL ADDFARE
07B9 C9              RET
              HRSTOP:
07BA 3A8620          LDA HRREGNO     ;GET TIMING REGISTER
07BD CDB708          CALL MINIDLE    ;IDLE TIMING REGISTER
07C0 3E08            MVI A,8
07C2 0E08            MVI C,8
07C4 CD8B04          CALL NOFLASH120
07C7 AF              XRA A
07C8 328A20          STA R6VAR       ;RE ENABLE ALL
07CB 3E80            MVI A,80H
07CD 328720          STA R4VAR       ;DISABLE HR BUT
07D0 0E05            MVI C,5
07D2 21D907          LXI H,HRSTOP1   ;FOR 5 MIN
07D5 CD4908          CALL SEIZEMIN
07D8 C9              RET
              HRSTOP1:
07D9 3A8720          LDA R4VAR
07DC E67F            ANI 7FH         ;REENABLE HR BUT
07DE 328720          STA R4VAR
07E1 C9              RET

WAITBUT:
07E2 3A6120          LDA GFLAGS1
07E5 47              MOV B,A
07E6 E608            ANI 08          ;IF SECOND HIT IS STOP
07E8 C21508          JNZ STOPWAIT
07EB 3E80            MVI A,80H
07ED 328720          STA R4VAR       ;LOCK OUT HOURLY
07F0 78              MOV A,B
07F1 F608            ORI 8
07F3 326120          STA GFLAGS1
07F6 0E06            MVI C,6         ;SET INITIAL MIN TO 6
07F8 C3FD07          JMP WAITSEG1+2
              WAITSEG1:
07FB 0E05            MVI C,5         ;5MIN AFTER FIRST INTERVAL
07FD 21FB07          LXI H,WAITSEG1
0800 CD4908          CALL SEIZEMIN   ;GET TIMING REG
0803 D8              RC
```

```
0804 328520        STA WAITREGNO    ;SAVE REGISTER NO.
0807 3E01          MVI A,1
0809 0E0F          MVI C,15
080B CD6104        CALL FLASH60
080E 2ABA09        LHLD WAITRATE
0811 CDF608        CALL ADDFARE
0814 C9           RET
                STOFWAIT:
0815 3A8520        LDA WAITREGNO    ;GET INDEX
0818 CDB708        CALL MINIDLE
081B 3E01          MVI A,1
081D 0E0F          MVI C,15
081F CD9004        CALL NOFLASH60
0822 3A6120        LDA GFLAGS1
0825 E6F7          ANI 0F7H
0827 326120        STA GFLAGS1      ;RESET FLAGS
082A 214008        LXI H,STWAIT1
082D 0E03          MVI C,3
082F CD4908        CALL SEIZEMIN
0832 D8            RC               ;NONE AVAIL IF CARRY
0833 3A8A20        LDA R6VAR
0836 F680          ORI 80H          ;DISABLE WAIT
0838 328A20        STA R6VAR
083B AF            XRA A
083C 328720        STA R4VAR        ;REENABLE HRLY
083F C9            RET
                STWAIT1:
0840 3A8A20        LDA R6VAR
0843 E67F          ANI 7FH          ;REENABLE WAIT BUT
0845 328A20        STA R6VAR
0849 C9            RET

;
                ;SEIZE MIN TIMING REGISTER
                ;HL=CLIENT RET ADD
                ;C=PACKED BCD MIN TERM COUNT
                ;
                ;
                SEIZEMIN:
0849 E5            PUSH H           ;SAVE CLIENT RET
084A C5            PUSH B           ;SAVE T.C.
084B 216B20        LXI H,MINREGS+2
084E 110500        LXI D,5
0851 0605          MVI B,5
                SEIZELOOP1:
0853 7E            MOV A,M
0854 B7            ORA A
0855 CA5108        JZ IDLEMIN       ;IDLE REGISTER FOUND
0858 19            DAD D
0859 05            DCR B
085A C25308        JNZ SEIZELOOP1
085D C1            POP B
085E E1            POP H
085F 37            STC              ;MARK NONE AVAIL FOR CALLING ROUTINE
```

```
0860 C9                RET             ;NONE IDLE IF HERE
            IDLEMIN:
0861 AF                XRA A
0862 23                INX H
0863 77                MOV M,A
0864 23                INX H
0865 77                MOV M,A         ;ZERO MIN & SEC
0866 2B                DCX H
0867 2B                DCX H
0868 3E05             MVI A,5
086A 90                SUB B           ;INDEX TO A
086B C1                POP B           ;GET T.C.
086C 71                MOV M,C         ;PUT IN REG
086D D1                POP D           ;GET CLIENT SEG ADD
086E 2B                DCX H
086F 72                MOV M,D
0870 2B                DCX H
0871 73                MOV M,E
0872 B7                ORA A           ;RESET CARRY A=REGISTER NO.
0873 C9                RET
            MINTIMER:
0874 0605             MVI B,5          ;5 REGISTERS
0876 216B20           LXI H,MINREGS+2
0879 110500           LXI D,5
            MINLOOP1:
087C 7E                MOV A,M
087D B7                ORA A
087E C28708           JNZ MINUPDATE
            MINLOOP2:
0881 19                DAD D           ;CHECK NEXT
0882 05                DCR B
0883 C27C08           JNZ MINLOOP1
0886 C9                RET
            MINUPDATE:
0887 23                INX H           ;COUNT
0888 23                INX H           ;5 SEC COUNTER
0889 7E                MOV A,M
088A 3C                INR A
088B FE0C             CPI 12
088D DA9108           JC $+4
0890 AF                XRA A
0891 77                MOV M,A
0892 2B                DCX H
0893 2B                DCX H
0894 DA8108           JC MINLOOP2
0897 23                INX H
0898 7E                MOV A,M         ;GET MINUTE COUNT
0899 C601             ADI 1
089B 27                DAA             ;TIME IN PACKED BCD
089C 77                MOV M,A
089D 2B                DCX H
089E BE                CMP M           ;SEE IF TERM COUNT=PRESENT CNT
089F C28108           JNZ MINLOOP2
08A2 3600             MVI M,0         ;IDLE THIS REGISTER IF TIMEOUT
08A4 E5                PUSH H          ;SAVE FOR RET
08A5 C5                PUSH B          ;SAVE LOOP COUNT
```

```
0BA6 D5              PUSH D          ;SAVE OFFSET
0BA7 2B              DCX H           ;POINT TO CLIENT
0BA8 11B108          LXI D,MINRET
0BAB D5              PUSH D          ;RET ADD TO STACK
0BAC 56              MOV D,M
0BAD 2B              DCX H
0BAE 5E              MOV E,M
0BAF EB              XCHG
0BB0 E9              PCHL            ;JMP TO CLIENT
            MINRET:
0BB1 D1              POP D
0BB2 C1              POP B
0BB3 E1              POP H
0BB4 C38108          JMP MINLOOP2    ;DONEXT

;IDLE MINUTE TIMING REGISTER
            ;REGISTER # IN A
            ;
            ;
            ;
            MINIDLE:
0BB7 110500          LXI D,5
0BBA 216B20          LXI H,MINREGS+2
0BBD B7              ORA A           ;REG=0
0BBE CAC608          JZ MINIDLE1
            MINIDLE2:
0BC1 19              DAD D
0BC2 3D              DCR A
0BC3 C2C108          JNZ MINIDLE2
            MINIDLE1:                ;HERE WHEN POSITIONED TO CORRECT
                                     ;REGISTER TO IDLE
0BC6 3600            MVI M,0
0BC8 C9              RET
            ;
            ;
            ;
            ;
            ETIMER:
0BC9 3A6120          LDA BFLAGS1
0BCC E680            ANI 80H
0BCE C8              RZ              ;NOT USING ELAPSED TIMER
0BCF 218420          LXI H,ETCTR+2
0BD2 7E              MOV A,M
0BD3 3C              INR A
0BD4 FE0C            CPI 12
0BD6 D2DB08          JNC ETMIN
0BD9 77              MOV M,A
0BDA C9              RET
            ETMIN:
0BDB 70              MOV M,0         ;ZERO 5 SEC COUNTER
0BDC 2B              DCX H           ;POINT TO MINS
0BDD 7E              MOV A,M
0BDE C601            ADI 1
0BE0 27              DAA
0BE1 FE60            CPI 60H
0BE3 D2E808          JNC ETHRS
0BE6 77              MOV M,A
```

```
08E7 C9              RET
              ETHR3:
08E8 70              MOV M,0
08E9 2B              DCX H
08EA 7E              MOV A,M
08EB C601            ADI 1
08ED 27              DAA
08EE FE99            CPI 99H
08F0 C2F408          JNZ ETHRZ
08F3 AF              XRA A
08F4 77       ETHRZ: MOV M,A
08F5 C9              RET

;
              ;
              ;AMOUNT TO ADD TO FARE IN HL
              ;
              ADDFARE:
08F6 EB              XCHG      ;AMT TO ADD TO DE
08F7 2A6720          LHLD FARE ;GET OLD
08FA 7B              MOV A,E
08FB 85              ADD L
08FC 27              DAA
08FD 6F              MOV L,A
08FE D20209          JNC $+4
0901 24              INR H
0902 7A              MOV A,D
0903 84              ADD H
0904 27              DAA
0905 67              MOV H,A
0906 226720          SHLD FARE
0909 EB              XCHG
090A CD9905          CALL FAREDISP
090D C9              RET

;
              ;
              ;DIGIT 0-9 TO SEVEN SEG TRANLATION TABLE
              ;
              ;
090E 3F06584F DIGITRN:   DB   3FH,06H,5BH,4FH
0912 6660D7C07       DB   66H,6DH,7CH,07H
0916 7F67            DB   7FH,67H

;ZONE TO ZONE RATE TABLE
              ;INDEXED BY TAXIRATE
              ;
              ;
              RATETBL:
0918 4501700145  DW   0145H,0170H,0245H,0320H,0390H,0460H,0530H
0926 0006700699  DW   0600H,0670H,9999H,9999H,9999H,9999H,9999H
0934 99999999    DW   9999H,9999H

;SCAN ROW PARAMETER BLOCKS
              ; 0-ACTIVITY MASK
              ; 1,2-POINTER TO VARIABLE BLOCK
```

```
                    ; 3,4-POINTER TO 0>1 CLIENT TABLE
                    ;
                    ;
0936 C0     R4PB:   DB      0C0H        ;MASK
0939 6720           DW      R4VAR
093B 4709           DW      R401CLI
093D F7     R6PB:   DB      0F7H
093E 8A20           DW      R6VAR
0940 6709           DW      R601CLI
0942 80     R7PB:   DB      080H
0943 8D20           DW      R7VAR
0945 8709           DW      R701CLI

;
                    ;0>1 CLIENT TABLES
                    ;1>0 CLIENT TABLES
                    ;THESE MUST BE 32 BYTES AND 0>1 FIRST
                    ;AS THEY ARE POINTED TO IN PARAMETER BLOCK
                    ;AND ADDRESSED BY SCAN PROCESSING IN THAT ORDER
                    ;FORMAT IS R_01CLI DW ROUTINE FOR BIT 0,ROUTINE FOR BIT 1,ETC,
                    ;               UNASSIGNED JOBS ARE FILLED WITH UASSGN
                    ;
                    ;
0947 A709A709A7 R401CLI: DW  UASSGN,UASSGN,UASSGN,UASSGN
094F A709A709A7         DW  UASSGN,UASSGN,UASSGN,RESBUT
0957 A709A709A7 R410CLI: DW  UASSGN,UASSGN,UASSGN,UASSGN
095F A709A709A7         DW  UASSGN,UASSGN,UASSGN,UASSGN
0967 D506ED0605 R601CLI: DW  PASSBUT,BAGBUT,TRKBUT,UASSGN
096F 1D07360748         DW  PERSBUT,TELBUT,PETBUT,WAITBUT
0977 A709A709A7 R610CLI: DW  UASSGN,UASSGN,UASSGN,UASSGN
097F A709A709A7         DW  UASSGN,UASSGN,UASSGN,UASSGN
0987 A709A709A7 R701CLI: DW  UASSGN,UASSGN,UASSGN,UASSGN
098F A709A709A7         DW  UASSGN,UASSGN,UASSGN,RESBUT
0997 A709A709A7 R710CLI: DW  UASSGN,UASSGN,UASSGN,UASSGN
099F A709A709A7         DW  UASSGN,UASSGN,UASSGN,UASSGN

;
                    ;
                    ;
09A7 C7     UASSGN:  RET    ;UASSIGNED BIT CHANGE

;
                    ;
                    ;
                    ;RATE ASSIGNMENTS
                    ;
                    ;
09A8 6500   TELRATE: DW     0065H
09AA 6500   PERSRATE: DW    0065H
09AC 2501   PETRATE: DW     0125H
09AE 7500   PASSRATE: DW    0075H
09B0 6500   RUSHRATE: DW    0065H
09B2 1500   BAGRATE: DW     0015H
09B4 2501   TRKRATE: DW     0125H
09B6 0009   HRRATE:  DW     0900H       ;FIRST HOUR
```

```
09B9 2502         HRRATE1:      DW      0225H   ;EACH 15MIN AFTER FIRST
09BA 7500         WAITRATE:     DW      0075H   ;EACH 5 MIN
                  ;
                  ;
                  ;LIMITS------------
                  ;MAX NO. OF ENTRIES FOR ANY BUTTON
                  ;
0009 =            PERSLIMIT:    EQU 9
0009 =            PASSLIMIT:    EQU 9
0009 =            BAGLIMIT:     EQU 9
0005 =            TRKLIMIT:     EQU 5
                  ;
                  ;
09BC 3122312231 JOB10:   DB      31H,22H,31H,22H,31H,26H,31H,22H,31H,22H
09CE 3122392231          DB      31H,22H,39H,22H,31H,26H,31H,22H,31H,0A0H
09D0 E003F503A8 VEC10:   DW      DSCAN,DCHKSCAN,CHKZONE,TESTD,IPM12D,DDDISP
09DC 00006D00           DW      0,DD100M
09E0 0230010003 JOB100:  DB      02H,30H,01H,00H,03H,20H,11H,00H,22H,0BCH
09EA 0D01         VEC100: DW     SANITY             ;MOVED TO 10MS INT
09EC 3801                DW     CLKRD
09EE 0000                DW     0
09F0 DF03                DW     TESTD
09F2 B902                DW     CLKSET
09F4 3506                DW     DTEST
09F6 0000                DW     0
09F8 BD00                DW     DD1S
09FA 000000000 JOB1S:    DB     0,0,0,0,3,0,0,0,0,3
0A04 7408D90800 VEC1S:   DW     MINTIMER,ETIMER,0,0,0,0,0,0
                  ;

##########################
                  #
                  #
                  #    1/31/85
                  #
                  #    TAXIRATE
                  #
                  #
                  #    ZONE-ZONE RATE CONVERSION TABLES
                  #ZONES 1A-H TO 5A-H
                  #LOWER NIBBLE BITS 0-3 IS LOWER PART OF ZONE
                  #
                  ##########################
                  TAXIRATE:
0A14 1011               DB 10H,11H        ;1A-
0A16 FFFF               DB 0FFH,0FFH      ;1A-1
0A18 2222F2FF           DB 22H,22H,0F2H,0FFH
0A1C 33333333           DB 33H,33H,33H,33H
0A20 44444444           DB 44H,44H,44H,44H
0A24 FFFFFFFF           DB 0FFH,0FFH,0FFH,0FFH
                        REPT 3
                        DW 0FFFFH,0FFFFH
                        ENDM
0A28 FFFFFFFF           DW 0FFFFH,0FFFFH
0A2C FFFFFFFF           DW 0FFFFH,0FFFFH
0A30 FFFFFFFF           DW 0FFFFH,0FFFFH
```

```
0A34 0111FFFF         DB 01H,11H,0FFH,0FFH
0A38 2222F2FF         DB 22H,22H,0F2H,0FFH
0A3C 33333333         DB 33H,33H,33H,33H
0A40 44444444         DB 44H,44H,44H,44H
0A44 F5FFFFFF         DB 0F5H,0FFH,0FFH,0FFH
                      REPT 3
                      DW 0FFFFH,0FFFFH
                      ENDM
0A48+FFFFFFFF         DW 0FFFFH,0FFFFH
0A4C+FFFFFFFF         DW 0FFFFH,0FFFFH
0A50+FFFFFFFF         DW 0FFFFH,0FFFFH
0A54 1110F1FF         DB 11H,10H,0F1H,0FFH
0A58 2222F2FF         DB 22H,22H,0F2H,0FFH
0A5C 33333333         DB 33H,33H,33H,33H
0A60 44444444         DB 44H,44H,44H,44H
0A64 F5FFFFFF         DB 0F5H,0FFH,0FFH,0FFH
                      REPT 3
                      DW 0FFFFH,0FFFFH
                      ENDM
0A68+FFFFFFFF         DW 0FFFFH,0FFFFH
0A6C+FFFFFFFF         DW 0FFFFH,0FFFFH
0A70+FFFFFFFF         DW 0FFFFH,0FFFFH
0A74 1101FFFF         DB 11H,01H,0FFH,0FFH
0A78 2222F2FF         DB 22H,22H,0F2H,0FFH
0A7C 33333333         DB 33H,33H,33H,33H
0A80 44444444         DB 44H,44H,44H,44H
0A84 F5FFFFFF         DB 0F5H,0FFH,0FFH,0FFH

REPT 814+3              ;1E,1F,1G,1H+0 FOR 1D-6,7,8
                      DW 0FFFFH,0FFFFH
                      ENDM
0A88+FFFFFFFF         DW 0FFFFH,0FFFFH
0A8C+FFFFFFFF         DW 0FFFFH,0FFFFH
0A90+FFFFFFFF         DW 0FFFFH,0FFFFH
0A94+FFFFFFFF         DW 0FFFFH,0FFFFH
0A98+FFFFFFFF         DW 0FFFFH,0FFFFH
0A9C+FFFFFFFF         DW 0FFFFH,0FFFFH
0AA0+FFFFFFFF         DW 0FFFFH,0FFFFH
0AA4+FFFFFFFF         DW 0FFFFH,0FFFFH
0AA8+FFFFFFFF         DW 0FFFFH,0FFFFH
0AAC+FFFFFFFF         DW 0FFFFH,0FFFFH
0AB0+FFFFFFFF         DW 0FFFFH,0FFFFH
0AB4+FFFFFFFF         DW 0FFFFH,0FFFFH
0AB8+FFFFFFFF         DW 0FFFFH,0FFFFH
0ABC+FFFFFFFF         DW 0FFFFH,0FFFFH
0AC0+FFFFFFFF         DW 0FFFFH,0FFFFH
0AC4+FFFFFFFF         DW 0FFFFH,0FFFFH
0AC8+FFFFFFFF         DW 0FFFFH,0FFFFH
0ACC+FFFFFFFF         DW 0FFFFH,0FFFFH
0AD0+FFFFFFFF         DW 0FFFFH,0FFFFH
0AD4+FFFFFFFF         DW 0FFFFH,0FFFFH
0AD8+FFFFFFFF         DW 0FFFFH,0FFFFH
0ADC+FFFFFFFF         DW 0FFFFH,0FFFFH
0AE0+FFFFFFFF         DW 0FFFFH,0FFFFH
0AE4+FFFFFFFF         DW 0FFFFH,0FFFFH
```

```
0AE8+FFFFFFFF          DW 0FFFFH,0FFFFH
0AEC+FFFFFFFF          DW 0FFFFH,0FFFFH
0AF0+FFFFFFFF          DW 0FFFFH,0FFFFH
0AF4+FFFFFFFF          DW 0FFFFH,0FFFFH
0AF8+FFFFFFFF          DW 0FFFFH,0FFFFH
0AFC+FFFFFFFF          DW 0FFFFH,0FFFFH
0B00+FFFFFFFF          DW 0FFFFH,0FFFFH
0B04+FFFFFFFF          DW 0FFFFH,0FFFFH
0B08+FFFFFFFF          DW 0FFFFH,0FFFFH
0B0C+FFFFFFFF          DW 0FFFFH,0FFFFH
0B10+FFFFFFFF          DW 0FFFFH,0FFFFH
0B14 2222FFFF          DB 22H,22H,0FFH,0FFH   ;ZONE 2A-
0B18 2133F2FF          DW 3321H,0FFF2H
0B1C 22434434          DW 4322H,3444H
0B20 33545555          DW 5433H,5555H
0B24 F6FFFFFF          DW 0FFF6H,0FFFFH
                       REPT 3
                       DW 0FFFFH,0FFFFH
                       ENDM
0B28+FFFFFFFF          DW 0FFFFH,0FFFFH
0B2C+FFFFFFFF          DW 0FFFFH,0FFFFH
0B30+FFFFFFFF          DW 0FFFFH,0FFFFH

0B34 2222FFFF          DW 2222H,0FFFFH ;2B
0B38 1232F3FF          DW 3212H,0FFF3H
0B3C 23324344          DW 3223H,4443H
0B40 33435455          DW 4333H,5554H
0B44 F6FFFFFF          DW 0FFF6H,0FFFFH
                       REPT 3
                       DW 0FFFFH,0FFFFH
                       ENDM
0B48+FFFFFFFF          DW 0FFFFH,0FFFFH
0B4C+FFFFFFFF          DW 0FFFFH,0FFFFH
0B50+FFFFFFFF          DW 0FFFFH,0FFFFH

0B54 2222FFFF          DW 2222H,0FFFFH ;2C
0B58 2321F3FF          DW 2123H,0FFF3H
0B5C 34223243          DW 2234H,4332H
0B60 44334344          DW 3344H,4443H
0B64 F5FFFFFF          DW 0FFF5H,0FFFFH
                       REPT 3
                       DW 0FFFFH,0FFFFH
                       ENDM
0B68+FFFFFFFF          DW 0FFFFH,0FFFFH
0B6C+FFFFFFFF          DW 0FFFFH,0FFFFH
0B70+FFFFFFFF          DW 0FFFFH,0FFFFH

0B74 2222FFFF          DW 2222H,0FFFFH ;2D
0B78 3312F2FF          DW 1233H,0FFF2H
0B7C 44332232          DW 3344H,3222H
0B80 55443333          DW 4455H,3333H
0B84 F4FFFFFF          DW 0FFF4H,0FFFFH
                       REPT 3
                       DW 0FFFFH,0FFFFH
                       ENDM
0B88+FFFFFFFF          DW 0FFFFH,0FFFFH
```

```
0B6C+FFFFFFFF          DW 0FFFFH,0FFFFH
0B70+FFFFFFFF          DW 0FFFFH,0FFFFH

0B74 2222FFFF          DW 2222H,0FFFFH ;2E
0B78 2223F1FF          DW 2332H,0FFF1H
0B7C 43443322          DW 4443H,2233H
0B80 54554433          DW 5554H,3344H
0B84 F4FFFFFF          DW 0FFF4H,0FFFFH
                       REPT 3
                       DW 0FFFFH,0FFFFH
                       ENDM
0BA8+FFFFFFFF          DW 0FFFFH,0FFFFH
0BAC+FFFFFFFF          DW 0FFFFH,0FFFFH
0BB0+FFFFFFFF          DW 0FFFFH,0FFFFH

REPT 8*3
                       DW 0FFFFH,0FFFFH
                       ENDM
0BB4+FFFFFFFF          DW 0FFFFH,0FFFFH
0BB8+FFFFFFFF          DW 0FFFFH,0FFFFH
0BBC+FFFFFFFF          DW 0FFFFH,0FFFFH
0BC0+FFFFFFFF          DW 0FFFFH,0FFFFH
0BC4+FFFFFFFF          DW 0FFFFH,0FFFFH
0BC8+FFFFFFFF          DW 0FFFFH,0FFFFH
0BCC+FFFFFFFF          DW 0FFFFH,0FFFFH
0BD0+FFFFFFFF          DW 0FFFFH,0FFFFH
0BD4+FFFFFFFF          DW 0FFFFH,0FFFFH
0BD8+FFFFFFFF          DW 0FFFFH,0FFFFH
0BDC+FFFFFFFF          DW 0FFFFH,0FFFFH
0BE0+FFFFFFFF          DW 0FFFFH,0FFFFH
0BE4+FFFFFFFF          DW 0FFFFH,0FFFFH
0BE8+FFFFFFFF          DW 0FFFFH,0FFFFH
0BEC+FFFFFFFF          DW 0FFFFH,0FFFFH
0BF0+FFFFFFFF          DW 0FFFFH,0FFFFH
0BF4+FFFFFFFF          DW 0FFFFH,0FFFFH
0BF8+FFFFFFFF          DW 0FFFFH,0FFFFH
0BFC+FFFFFFFF          DW 0FFFFH,0FFFFH
0C00+FFFFFFFF          DW 0FFFFH,0FFFFH
0C04+FFFFFFFF          DW 0FFFFH,0FFFFH
0C08+FFFFFFFF          DW 0FFFFH,0FFFFH
0C0C+FFFFFFFF          DW 0FFFFH,0FFFFH
0C10+FFFFFFFF          DW 0FFFFH,0FFFFH

0C14 3333FFFF          DW 3333H,0FFFFH ;3A
0C18 3244F3FF          DW 4432H,0FFF3H
0C1C 21435545          DW 4321H,4555H
0C20 32536666          DW 5332H,6663H
0C24 F7FFFFFF          DW 0FFF7H,0FFFFH
                       REPT 3
                       DW 0FFFFH,0FFFFH
                       ENDM
0C28+FFFFFFFF          DW 0FFFFH,0FFFFH
0C2C+FFFFFFFF          DW 0FFFFH,0FFFFH
0C30+FFFFFFFF          DW 0FFFFH,0FFFFH
```

```
0C34 3333FFFF           DW 3333H,0FFFFH ;3B
0C38 2243F4FF           DW 4322H,0FFF4H
0C3C 12325455           DW 3212H,5554H
0C40 22426666           DW 4222H,6666H
0C44 F7FFFFFF           DW 0FFF7H,0FFFFH
                        REPT 3
                        DW 0FFFFH,0FFFFH
                        ENDM
0C48+FFFFFFFF           DW 0FFFFH,0FFFFH
0C4C+FFFFFFFF           DW 0FFFFH,0FFFFH
0C50+FFFFFFFF           DW 0FFFFH,0FFFFH

0C54 3333FFFF           DW 3333H,0FFFFH ;3C
0C58 2332F4FF           DW 3223H,0FFF4H
0C5C 23215355           DW 2123H,5553H
0C60 23326466           DW 3223H,6664H
0C64 F7FFFFFF           DW 0FFF7H,0FFFFH
                        REPT 3
                        DW 0FFFFH,0FFFFH
                        ENDM
0C68+FFFFFFFF           DW 0FFFFH,0FFFFH
0C6C+FFFFFFFF           DW 0FFFFH,0FFFFH
0C70+FFFFFFFF           DW 0FFFFH,0FFFFH

0C74 3333FFFF           DW 3333H,0FFFFH ;3D
0C78 3432F4FF           DW 3234H,0FFF4H
0C7C 34124354           DW 1234H,5443H
0C80 45235455           DW 2345H,5554H
0C84 F6FFFFFF           DW 0FFF6H,0FFFFH
                        REPT 3
                        DW 0FFFFH,0FFFFH
                        ENDM
0C88+FFFFFFFF           DW 0FFFFH,0FFFFH
0C8C+FFFFFFFF           DW 0FFFFH,0FFFFH
0C90+FFFFFFFF           DW 0FFFFH,0FFFFH

0C94 3333FFFF           DW 3333H,0FFFFH ;3E
0C98 3422F3FF           DW 2234H,0FFF3H
0C9C 45332143           DW 3345H,4321H
0CA0 66342243           DW 3466H,4322H
0CA4 F5FFFFFF           DW 0FFF5H,0FFFFH
                        REPT 3
                        DW 0FFFFH,0FFFFH
                        ENDM
0CA8+FFFFFFFF           DW 0FFFFH,0FFFFH
0CAC+FFFFFFFF           DW 0FFFFH,0FFFFH
0CB0+FFFFFFFF           DW 0FFFFH,0FFFFH

0CB4 3333FFFF           DW 3333H,0FFFFH ;3F
0CB8 4423F3FF           DW 2344H,0FFF3H
0CBC 55451242           DW 4555H,4212H
0CC0 66462332           DW 4666H,3223H
0CC4 F4FFFFFF           DW 0FFF4H,0FFFFH
                        REPT 3
                        DW 0FFFFH,0FFFFH
```

```
                        ENDM
0CC8+FFFFFFFF           DW 0FFFFH,0FFFFH
0CCC+FFFFFFFF           DW 0FFFFH,0FFFFH
0CD0+FFFFFFFF           DW 0FFFFH,0FFFFH

0CD4 3333FFFF           DW 3333H,0FFFFH ;3G
0CD8 4423F2FF           DW 2344H,0FFF2H
0CDC 55452331           DW 4555H,3123H
0CE0 66552422           DW 5666H,2224H
0CE4 F3FFFFFF           DW 0FFF3H,0FFFFH
                        REPT 3
                        DW 0FFFFH,0FFFFH
                        ENDM
0CE8+FFFFFFFF           DW 0FFFFH,0FFFFH
0CEC+FFFFFFFF           DW 0FFFFH,0FFFFH
0CF0+FFFFFFFF           DW 0FFFFH,0FFFFH

0CF4 3333FFFF           DW 3333H,0FFFFH ;3H
0CF8 4334F2FF           DW 3443H,0FFF2H
0CFC 54554413           DW 5554H,1344H
0D00 65665544           DW 6665H,4455H
0D04 F5FFFFFF           DW 0FFF5H,0FFFFH
                        REPT 3
                        DW 0FFFFH,0FFFFH
                        ENDM
0D08+FFFFFFFF           DW 0FFFFH,0FFFFH
0D0C+FFFFFFFF           DW 0FFFFH,0FFFFH
0D10+FFFFFFFF           DW 0FFFFH,0FFFFH

0D14 4444FFFF           DW 4444H,0FFFFH ;4A
0D18 3354F4FF           DW 5433H,0FFF4H
0D1C 22536656           DW 5322H,5666H
0D20 21537777           DW 5321H,7777H
0D24 F8FFFFFF           DW 0FFF8H,0FFFFH
                        REPT 3
                        DW 0FFFFH,0FFFFH
                        ENDM
0D28+FFFFFFFF           DW 0FFFFH,0FFFFH
0D2C+FFFFFFFF           DW 0FFFFH,0FFFFH
0D30+FFFFFFFF           DW 0FFFFH,0FFFFH

0D34 4444FFFF           DW 4444H,0FFFFH ;4B
0D38 3354F5FF           DW 5433H,0FFF5H
0D3C 23426666           DW 4223H,6666H
0D40 12427677           DW 4212H,7776H
0D44 F8FFFFFF           DW 0FFF8H,0FFFFH
                        REPT 3
                        DW 0FFFFH,0FFFFH
                        ENDM
0D48+FFFFFFFF           DW 0FFFFH,0FFFFH
0D4C+FFFFFFFF           DW 0FFFFH,0FFFFH
0D50+FFFFFFFF           DW 0FFFFH,0FFFFH

0D54 4444FFFF           DW 4444H,0FFFFH ;4C
```

```
0D58 3443F5FF        DW 4334H,0FFF5H
0D5C 23326466        DW 3223H,6664H
0D60 23216577        DW 2123H,7765H
0D64 F8FFFFFF        DW 0FFF8H,0FFFFH
                     REPT 3
                     DW 0FFFFH,0FFFFH
                     ENDM
0D68+FFFFFFFF        DW 0FFFFH,0FFFFH
0D6C+FFFFFFFF        DW 0FFFFH,0FFFFH
0D70+FFFFFFFF        DW 0FFFFH,0FFFFH

0D74 4444FFFF        DW 4444H,0FFFFH ;4D
0D78 4543F5FF        DW 4345H,0FFF5H
0D7C 45234365        DW 2345H,6543H
0D80 45125466        DW 1245H,6654H
0D84 F7FFFFFF        DW 0FFF7H,0FFFFH
                     REPT 3
                     DW 0FFFFH,0FFFFH
                     ENDM
0D88+FFFFFFFF        DW 0FFFFH,0FFFFH
0D8C+FFFFFFFF        DW 0FFFFH,0FFFFH
0D90+FFFFFFFF        DW 0FFFFH,0FFFFH

0D94 4444FFFF        DW 4444H,0FFFFH ;4E
0D98 4533F4FF        DW 3345H,0FFF4H
0D9C 66443254        DW 4466H,5432H
0DA0 67452143        DW 4567H,4321H
0DA4 F4FFFFFF        DW 0FFF4H,0FFFFH
                     REPT 3
                     DW 0FFFFH,0FFFFH
                     ENDM
0DA8+FFFFFFFF        DW 0FFFFH,0FFFFH
0DAC+FFFFFFFF        DW 0FFFFH,0FFFFH
0DB0+FFFFFFFF        DW 0FFFFH,0FFFFH

0DB4 4444FFFF        DW 4444H,0FFFFH ;4F
0DB8 5534F4FF        DW 3455H,0FFF4H
0DBC 66562252        DW 5666H,5222H
0DC0 77561232        DW 5677H,3212H
0DC4 F3FFFFFF        DW 0FFF3H,0FFFFH
                     REPT 3
                     DW 0FFFFH,0FFFFH
                     ENDM
0DC8+FFFFFFFF        DW 0FFFFH,0FFFFH
0DCC+FFFFFFFF        DW 0FFFFH,0FFFFH
0DD0+FFFFFFFF        DW 0FFFFH,0FFFFH

0DD4 4444FFFF        DW 4444H,0FFFFH ;4G
0DD8 5534F3FF        DW 3455H,0FFF3H
0DDC 66562342        DW 5666H,4223H
0DE0 77672321        DW 6777H,2123H
0DE4 F2FFFFFF        DW 0FFF2H,0FFFFH
                     REPT 3
                     DW 0FFFFH,0FFFFH
                     ENDM
0DE8+FFFFFFFF        DW 0FFFFH,0FFFFH
```

```
0DEC+FFFFFFFF         DW 0FFFFH,0FFFFH
0DF0+FFFFFFFF         DW 0FFFFH,0FFFFH

0DF4 4444FFFF         DW 4444H,0FFFFH    ;4H
0DF8 5534F3FF         DW 3455H,0FFF3H
0DFC 66563442         DW 5666H,4234H
0E00 77673412         DW 6777H,1234H
0E04 F2FFFFFF         DW 0FFF2H,0FFFFH
                      REPT 3
                      DW 0FFFFH,0FFFFH
                      ENDM
0E08+FFFFFFFF         DW 0FFFFH,0FFFFH
0E0C+FFFFFFFF         DW 0FFFFH,0FFFFH
0E10+FFFFFFFF         DW 0FFFFH,0FFFFH

0E14 5555FFFF         DW  5555H,0FFFFH         ;5A
0E18 6645F4FF         DW 4566H,0FFF4H
0E1C 77674553         DW 6777H,5345H
0E20 98783422         DW 7898H,2234H
0E24 F1FFFFFF         DW 0FFF1H,0FFFFH
                      REPT 3
                      DW 0FFFFH,0FFFFH
                      ENDM
0E28+FFFFFFFF         DW 0FFFFH,0FFFFH
0E2C+FFFFFFFF         DW 0FFFFH,0FFFFH
0E30+FFFFFFFF         DW 0FFFFH,0FFFFH

2000                  ORG 2000H
2000       IND10:   DS    1       ;10MS INDEX SAVE
2001       IND100:  DS    1       ;100MS INDEX SAVE
2002       IND1S:   DS    1       ;1 SEC INDEX SAVE
2003       SAV10:   DS    1       ;10 MS JOB BIT SAVE
2004       SAV100:  DS    1       ;100 MS JOB BIT SAVE
2005       SAV1S:   DS    1       ;1 SEC JOB BIT SAVE
                                  ;
2006       OUTDAT0:DS 1            ;OUTPUT ROW SAVE
2007       OUTDAT1: DS 1           ;OUTPUT ROW 1 SAVE
2008       OUTDAT2: DS 1           ;OUTPUT ROW 2 SAVE
2009       VCTR:    DS 1           ;COUNTER FOR DISPLAY UPDATE
200A       MBUFF:   DS 18          ;SCREEN DISP BUFF
2012 =     DTEADD: EQU    MBUFF+8          ;DATE DISP ADD
200A =     TIMADD: EQU    MBUFF            ;TIME
                      ;
201D       NPASS:  DS 1    ;NO. OF PASSENGERS
201D       NPETS:  DS 1
201E       NBAGS:  DS 1    ;NO. OF BAGS
201F       NTRKS:  DS 1
2020       NPSERV: DS 1    ;NO. OF PERSONAL SERVICES
                      ;
                      ;
2021       DSCNDAT0:      DS 8    ;RAW READ OF KEYS
                      ;
                      ;
```

```
2027        DISPDAT0:       DS 16   ;DATA TO SEND TO DISP BUFFER0
2037        SEQUENCE:       DS 1
2038        DBITS:   DS 1
203B        DNUMB:   DS 1
203C        ORGZONE:        DS 2    ;RATE TABLE INDEX
203E        FLSH60:  DS 16
204E        FLSH120:        DS 16
205E        FLG60:   DS 1   ;ON -OFF FLAG FOR 60IPM
205F        FLG120:  DS 1   ;              120 IPM
2060        FLASHCNT:       DS 1    ;COUNTER FOR 120/60 IPM
2061        GFLAGS1:        DS 1    ;GENERAL FLAGS
                            ;BIT 0=RUSH HOUR
                            ;BIT 1=PM
                            ;     2=TEL CALL
                            ;     3=WAIT SET
                            ;     4=HR RATE SET
                            ;     5=ELAPSED DISP/TIME DISP SWITCH
                            ;     6=PERSONAL SERVICE FLAG
                            ;     7=E.T. COUNT FLAG
2062        TEST0:   DS 1
2063        TEST1:   DS 1
2064        TEST2:   DS 1
2065        TEST3:   DS 1
2066        ZONEFLAG:       DS 1    ;FLAGS FOR ZONE INPUT
2067        FARE:    DS 2   ;PACKED BCD FARE
2069        MINREGS:        DS 5*5  ;1 MIN TIMERS
                            ;BYTE  0-CLIENT RET L
                            ;      1-CLIENT RET H
                            ;      2-TERMINAL COUNT
                            ;      3-MINUTE COUNT
                            ;      4-5 SEC COUNT

2082        ETCTR:   DS 3            ;BYTE  0-HOURS
                            ;      1-MINUTES
                            ;      2-5 SECONDS
2085        WAITREGNO:      DS 1    ;HOLDER FOR WAIT TIMING REGISTER INDEX
2086        HRREGNO:        DS 1    ;HOLDER FOR HOUR TIMING REGISTER INDEX

;
            ;
            ;
2087        R4VAR:   DS 3   ;ROW 4 VARIABLE BLOCK
208A        R6VAR:   DS 3   ;ROW 6 VARIABLE BLOCK
208D        R7VAR:   DS 3   ;ROW 7
2090                 END
```

Although the present invention has been described primarily with reference to a preferred embodiment, rearrangement and modifications may be made by one skilled in the art within the scope of the invention.

What is claimed is:

1. A fare computer, for digitally calculating an accrued fare for desired transportation within a zoned tariff locality between a first point in a selected zone of origin within the locality and a second point in a selected zone of destination within the locality according to a tariff schedule and for displaying the accrued fare and visual representations of charges contributing to the accrued fare, said fare computer comprising:

digital memory means adapted for storing rate schedule data, including one or more tariff schedules containing a schedule of primary fare charges for transportation from a point in any zone selected as the zone of origin to a point in any zone selected as the zone of destination, and a fare calculation program;

operator actuated input means for permitting selection of one of the tariff schedules and of a zone of origin and a zone of destination of the transportation;

means connecting said memory means and said input means and responsive to the selection of one of the tariff schedules and of the zone of origin and the zone of destination for obtaining from the selected tariff schedule fare charge data indicative of the fare charge for transportation from a point in the selected zone of origin to a point in the selected zone of destination and entering the obtained fare charge data into said digital memory means for storage therein;

processing circuit means adapted to interrogate said memory means for stored fare charge data therein to derive signals representative of the accrued fare and charges contributing to the accrued fare; and display means, responsive to the signals derived by said processing circuit means, for digitally displaying the accrued fare as the fare for transportation from a point in the zone of origin to a point in the zone of destination and for displaying visual representations of charges contributing to the accrued fare.

2. The fare computer as claimed in claim 1 wherein said digital memory means includes a first memory unit for permanently storing the rate schedule data and a processing circuit fare calculation program, and a second memory unit for temporarily storing fare charge data obtained from the selected tariff schedule.

3. The fare computer as claimed in claim 2 wherein said tariff schedules include a primary fare charge schedule for travel from the selected zone of origin of the transportation to the selected zone of destination of the transportation and a secondary fare charge schedule, and wherein said display means further comprises travel display means for displaying representations of the selected zone of origin of the transportation and the selected zone of destination of the transportation and secondary fare charge display means for displaying representations of secondary fare charges obtained from said secondary fare charge schedule.

4. The fare computer as claimed in claim 3 wherein said tariff schedule further include a further fare charge schedule, representative of the time required for the transportation, said display means including means permitting displaying the accrued fare according to the further fare charge schedule.

5. The fare computer as claimed in claim 3 wherein said display means includes a map and a plurality of indicating means for selectively indicating the selected zone of origin and the selected zone of destination on said map.

6. The fare computer as claimed in claim 2 wherein said first memory unit includes a read-only-memory and said second memory unit comprises a random access memory.

7. The fare computer as claimed in claim 6 wherein said processing circuit means is a microprocessor.

* * * * *